United States Patent
Kaburagi et al.

(10) Patent No.: US 10,516,161 B2
(45) Date of Patent: Dec. 24, 2019

(54) NEGATIVE ELECTRODE ACTIVE MATERIAL FOR ELECTRIC DEVICE AND ELECTRIC DEVICE USING THE SAME

(71) Applicant: Nissan Motor Co., Ltd., Yokohama-shi, Kanagawa (JP)

(72) Inventors: Tomohiro Kaburagi, Kanagawa (JP); Manabu Watanabe, Kanagawa (JP); Nobutaka Chiba, Kanagawa (JP); Humihiro Miki, Kanagawa (JP); Makoto Tanimura, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 9 days.

(21) Appl. No.: 15/536,935

(22) PCT Filed: Dec. 17, 2014

(86) PCT No.: PCT/JP2014/083476
§ 371 (c)(1),
(2) Date: Jun. 16, 2017

(87) PCT Pub. No.: WO2016/098210
PCT Pub. Date: Jun. 23, 2016

(65) Prior Publication Data
US 2018/0131002 A1    May 10, 2018

(51) Int. Cl.
*H01M 4/38* (2006.01)
*H01M 4/36* (2006.01)
(Continued)

(52) U.S. Cl.
CPC .......... *H01M 4/386* (2013.01); *H01M 4/364* (2013.01); *H01M 10/0525* (2013.01); *H01M 2004/027* (2013.01)

(58) Field of Classification Search
CPC .... H01M 4/386; H01M 4/364; H01M 10/052; H01M 10/0525; H01M 2004/027
See application file for complete search history.

(56) References Cited

U.S. PATENT DOCUMENTS

| | | | |
|---|---|---|---|
| 9,325,003 B2 | 4/2016 | Watanabe et al. | |
| 2003/0096168 A1* | 5/2003 | Kasamatsu | H01M 4/366 429/231.95 |

(Continued)

FOREIGN PATENT DOCUMENTS

| | | |
|---|---|---|
| EP | 3236515 A1 | 10/2017 |
| JP | 2004311428 A | 11/2004 |

(Continued)

OTHER PUBLICATIONS

Mixer/Mill High Energy Ball Mill Brochure.*

*Primary Examiner* — Miriam Stagg
*Assistant Examiner* — Lilia Nedialkova
(74) *Attorney, Agent, or Firm* — Young Basile Hanlon & MacFarlane, P.C.

(57) ABSTRACT

A negative electrode active material includes a silicon-containing alloy represented by: $Si_xSn_yM_zA_a$ (A is unavoidable impurities, M is one or more transition metal elements, x, y, z, and a represent values of percent by mass, and $0<x<100$, $0<y<100$, $0<z<100$, and $0\leq a<0.5$ and $x+y+z+a=100$). The silicon-containing alloy has a lattice image subjected to Fourier transform processing to obtain a diffraction pattern. A distance between Si regular tetrahedrons is 0.39 nm or more when the distance between Si regular tetrahedrons in an amorphous region calculated from a Fourier image obtained by subjecting a diffraction ring portion present in a width of from 0.7 to 1.0 when a distance between Si regular tetrahedrons is 1.0 in this diffraction pattern to inverse Fourier transform is 10 nm or less.

17 Claims, 5 Drawing Sheets

(51) Int. Cl.
*H01M 10/0525* (2010.01)
*H01M 4/02* (2006.01)

(56) References Cited

U.S. PATENT DOCUMENTS

| | | |
|---|---|---|
| 2004/0248011 A1 | 12/2004 | Asao et al. |
| 2006/0040182 A1 | 2/2006 | Kawakami et al. |
| 2007/0148544 A1* | 6/2007 | Le .......................... B22F 9/002 |
| | | 429/218.1 |
| 2007/0200101 A1 | 8/2007 | Asao et al. |
| 2008/0013271 A1 | 1/2008 | Peng et al. |
| 2009/0061322 A1 | 3/2009 | Kawakami et al. |
| 2012/0258370 A1* | 10/2012 | Miyoshi .................. C01B 33/24 |
| | | 429/231.6 |
| 2012/0319038 A1 | 12/2012 | Ide et al. |
| 2014/0353546 A1 | 12/2014 | Watanabe et al. |
| 2015/0303465 A1 | 10/2015 | Watanabe et al. |
| 2016/0087270 A1 | 3/2016 | Yoshikawa et al. |

FOREIGN PATENT DOCUMENTS

| | | | | |
|---|---|---|---|---|
| JP | 2004311429 A | 11/2004 | | |
| JP | 2013134905 A | 7/2013 | | |
| JP | WO2014188851 A1 | 2/2017 | | |
| WO | 2006129415 A1 | 12/2006 | | |
| WO | 2011111709 A1 | 9/2011 | | |
| WO | WO-2013099441 A1 * | 7/2013 | ............. | C23C 14/35 |
| WO | 2014080888 A1 | 5/2014 | | |

* cited by examiner

EXAMPLE 1

EXAMPLE 2

EXAMPLE 3

NEGATIVE ELECTRODE ACTIVE MATERIAL FOR ELECTRIC DEVICE AND ELECTRIC DEVICE USING THE SAME

TECHNICAL FIELD

The present invention relates to a negative electrode active material for electric device, and an electric device using the same. The negative electrode active material for electric device and the electric device using the same according to the present invention are used in a driving power source and an auxiliary power source for motors of vehicles such as electric vehicles, fuel cell vehicles, and hybrid electric vehicles as secondary batteries, capacitors, and the like.

BACKGROUND

In recent years, cut down of the amount of carbon dioxide has been ardently desired in order to cope with air pollution and global warming. In the motor vehicle industry, cut down of carbon dioxide emissions due to introduction of electric vehicles (EV) and hybrid electric vehicles (HEV) has been highly expected, and development of electric devices such as secondary batteries for driving motors, which hold the key to practical use of these has been actively carried out.

The secondary batteries for driving motors are required to exhibit extremely high-output characteristics and high energy as compared to consumer lithium ion secondary batteries to be used in mobile phones, notebook computers, and the like. Hence, lithium ion secondary batteries having the highest theoretical energy among all the batteries have attracted attention, and development thereof is rapidly advanced at present.

A lithium ion secondary battery generally has a configuration in which a positive electrode in which a positive electrode active material and the like are coated on both sides of a positive electrode current collector by using a binder and a negative electrode in which a negative electrode active material and the like are coated on both sides of a negative electrode current collector by using a binder are connected to each other via an electrolyte layer and housed in a battery case.

Hitherto, a carbon and graphite-based material, which is advantageous from the viewpoint of lifespan of charge and discharge cycles and cost, has been used in the negative electrode of a lithium ion secondary battery. However, in the case of a carbon and graphite-based negative electrode material, charge and discharge proceed by occlusion and release of lithium ions into and from the graphite crystals, and there is thus a disadvantage that a charge and discharge capacity that is equal to or higher than the theoretical capacity, 372 mAh/g, to be obtained from $LiC_6$ of the maximum lithium-introduced compound is not obtained. For this reason, it is difficult to obtain a capacity and an energy density which satisfy the practical use level of a vehicle application from a carbon and graphite-based negative electrode material.

In contrast, a battery using a material to be alloyed with Li in the negative electrode is expected as a negative electrode material in a vehicle application since the energy density is improved as compared to a conventional carbon and graphite-based negative electrode material. For example, an Si material occludes and releases 3.75 mol of lithium ions per 1 mol as in the following Reaction Formula (A) in charge and discharge, and the theoretical capacity is 3600 mAh/g in $Li_{15}Si_4$ ($=Li_{3.75}Si$).

[Chemical Formula 1]

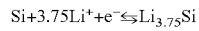

$$Si + 3.75 Li^+ + e^- \leftrightarrows Li_{3.75}Si \quad (A)$$

However, in a lithium ion secondary battery using a material to be alloyed with Li in the negative electrode, expansion and contraction of the negative electrode at the time of charge and discharge is great. For example, the volume expansion in the case of occluding a Li ion is about 1.2 times for a graphite material, but a great volume change (about 4 times) occurs for the Si material since the amorphous state is converted to a crystalline state when Si and Li are alloyed, and there is thus a problem that the cycle lifespan of the electrode decreases. In addition, in the case of an Si negative electrode active material, the capacity and the cycle durability have a trade-off relationship, and there is thus a problem that it is difficult to improve the cycle durability while having a high capacity.

Here, WO 2006/129415 A discloses an invention aimed to provide a nonaqueous electrolyte secondary battery including a negative electrode pellet having a high capacity and an excellent cycle lifespan. Specifically, a silicon-containing alloy is disclosed which is obtained by mixing and wet pulverizing a silicon powder and a titanium powder by a mechanical alloying method and in which a material including a first phase containing silicon as a main body and a second phase containing a silicide of titanium ($TiSi_2$ or the like) is used as a negative electrode active material. It is also disclosed that at least either of these two phases is amorphous or low crystalline.

According to the investigations of the present inventors, in an electric device such as a lithium ion secondary battery using the negative electrode pellet described in WO 2006/129415 A, it has been revealed that the cycle durability is not sufficient in some cases even though it is described that favorable cycle durability can be exhibited.

SUMMARY

Accordingly, an object of the present invention is to provide a means capable of improving the cycle durability of an electric device such as a lithium ion secondary battery.

In order to solve the above problem, the present inventors have carried out intensive researches. As a result, in WO 2006/129415 A, it is indicated that the durability is improved by amorphizing silicon (Si) in the case of using a silicon-containing alloy (Si alloy). Usually, the state of amorphization is defined by the full width at half maximum and the like of the Si (111) diffraction line in X-ray diffraction (XRD). However, it has been found out that an Si alloy from which a diffraction line of the Si (111) plane is confirmed (corresponding to the silicon-containing alloy of WO 2006/129415 A) is insufficient in order to obtain an Si alloy having high durability performance. In addition, in the Si alloy of WO 2006/129415 A, the distance between Si tetrahedrons is not mentioned, and it has been understood that the distance between Si tetrahedrons is not substantially changed from the kinds of added metals (Ti and the like). That is, it has been understood that a great diffraction line peak shift is not confirmed and the distance between Si tetrahedrons is not substantially changed in a sample (Si alloy) that has not undergone amorphization after which an Si (111) diffraction line peak is observed in XRD. As a result of further investigations based on these findings, it has been found out that it is important that a diffraction pattern is obtained by subjecting the lattice image of the Si alloy obtained by using a transmission electron microscope (TEM) to Fourier transform processing and the diffraction ring portion of the Si (220) plane is confirmed in this diffraction pattern. In addition, it has been found out that the above problems can be solved when the distance between Si regular tetrahedrons in an amorphous region in the Fourier image obtained by subjecting the diffraction ring portion to inverse Fourier transform is extended to a certain value or more, and whereby the present invention has been completed.

That is, the object of the present invention is achieved by a negative electrode active material including a silicon-containing alloy having a composition represented by the following Chemical Formula (I);

[Chemical Formula 2]

in Chemical Formula (I) above, A is unavoidable impurities, M is one or two or more transition metal elements, x, y, z, and a represent values of percent by mass, and 0<x<100, 0<y<100, 0<z<100, and 0≤a<0.5 and x+y+z+a=100. Furthermore, a lattice image of the silicon-containing alloy obtained by using a transmission electron microscope (TEM) is subjected to Fourier transform processing to obtain a diffraction pattern. The distance between Si regular tetrahedrons is 0.39 nm or more when a distance between Si regular tetrahedrons in an amorphous region is calculated from a Fourier image obtained by subjecting a diffraction ring portion present in a width of from 0.7 to 1.0 when the distance between Si regular tetrahedrons is 1.0 in this diffraction pattern to inverse Fourier transform.

BRIEF DESCRIPTION OF THE DRAWINGS

FIG. 2(B) illustrates a diffraction pattern acquired by subjecting a portion enclosed by a red frame of the observation image illustrated in FIG. 2(A), namely, a lattice image (TEM image) when silicon-containing alloy (negative electrode active material) particles are observed through a TEM by using a silicon-containing alloy (more specifically, one fabricated in Example 3) as a sample to be observed to Fourier transform.

FIG. 5 is a view which illustrates the results for the distance between Si regular tetrahedrons in an amorphous region measured (calculated) from a Fourier image obtained through image analysis using a TEM image of a negative electrode active material (silicon-containing alloy) fabricated in each of Examples 1 to 6 and Comparative Examples 1 and 2 or the like.

BRIEF DESCRIPTION OF THE EMBODIMENTS

Figure 1:
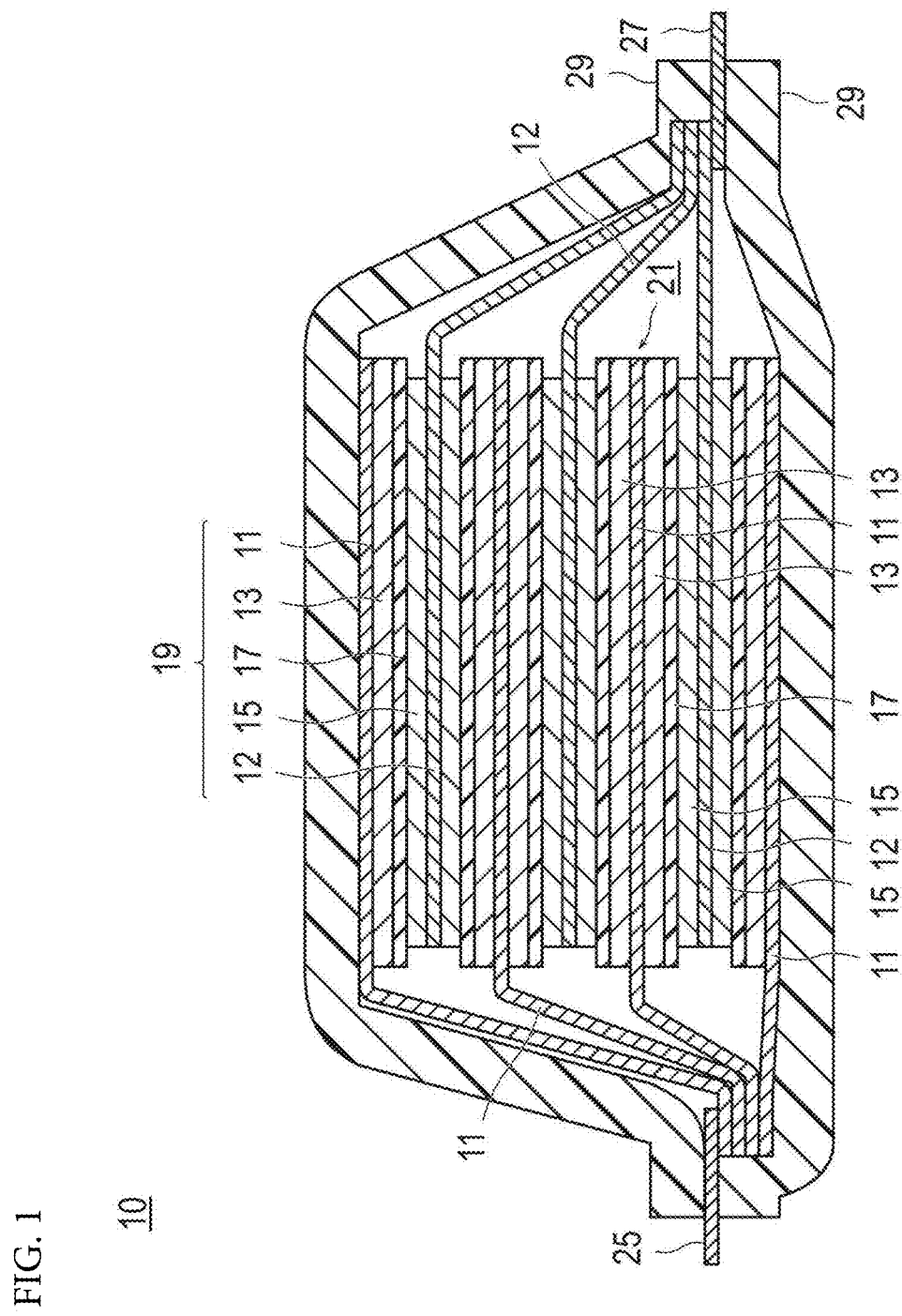
FIG. 1 is a cross-sectional schematic view which schematically illustrates the outline of a stacked type flat non-bipolar lithium ion secondary battery of a representative embodiment of an electric device according to the present invention.

Hereinafter, embodiments of a negative electrode active material for electric device and an electric device using the same of the present invention will be described with reference to the drawings. However, the technical scope of the present invention should be determined based on the description of claims and is not limited to only the following embodiments. Incidentally, in the description of the drawings, the same elements are denoted by the same reference numerals, and duplicate descriptions are omitted. In addition, the dimensional ratios of the drawings are exaggerated for convenience of description and may differ from actual ratios.

An embodiment (first embodiment) of the negative electrode active material for electric device of the present invention is a negative electrode active material formed of a silicon-containing alloy having a composition represented by the following Chemical Formula (I).

[Chemical Formula 3]

In Chemical Formula (I) above, A is unavoidable impurities, M is one or two or more transition metal elements, x, y, z, and a represent values of percent by mass, and 0<x<100, 0<y<100, 0<z<100, and 0≤a<0.5 and x+y+z+a=100. Furthermore, in the present embodiment, a lattice image of the silicon-containing alloy obtained by using a transmission electron microscope (TEM) is subjected to Fourier transform processing to obtain a diffraction pattern, and a distance between Si regular tetrahedrons is 0.39 nm or more when the distance between Si regular tetrahedrons in an amorphous region is calculated from a Fourier image obtained by subjecting a diffraction ring portion present in a width of from 0.7 to 1.0 when a distance between Si regular tetrahedrons is 1.0 in this diffraction pattern to inverse Fourier transform. In addition, a negative electrode for electric device of the present embodiment is formed by using the negative electrode active material for electric device of the present embodiment. Furthermore, an electric device of the present embodiment is formed by using the negative electrode for electric device of the present embodiment. According to the negative electrode active material of the present embodiment and the negative electrode and electric device using the same, the distance between Si regular tetrahedrons (distance between Si and Si) in an amorphous region in the Si alloy active material can be extended to 0.39 nm or more by promoting the amorphization. This makes it possible for Li ions to be easily intercalated into and deintercalated from the extended space between Si and Si and to easily move at the time of charge and discharge. As a result, it is possible to greatly improve the durability of the negative electrode and electric device using the negative electrode active material of the present embodiment.

Hereinafter, a basic configuration of an electric device to which the negative electrode active material for electric device of the present embodiment can be applied will be described with reference to the drawings. In the present embodiment, a lithium ion secondary battery will be described as an example of the electric device.

First, in a negative electrode for lithium ion secondary battery of a representative embodiment of a negative electrode containing the negative electrode active material for electric device according to the present invention, and a lithium ion secondary battery using the same, the voltage of the cell (single battery layer) is great and a high-energy density and a high-output density can be achieved. For this reason, a lithium ion secondary battery using the negative electrode active material for lithium ion secondary battery of the present embodiment is excellent for driving power source and auxiliary power source of a vehicle. As a result, it can be suitably used as a lithium ion secondary battery for driving power and the like of a vehicle. In addition to this, it can also be sufficiently applied to a lithium ion secondary battery for mobile devices such as mobile phones.

That is, the lithium ion secondary battery to be a target of the present embodiment may be one that is formed by using the negative electrode active material for lithium ion secondary battery of the present embodiment to be described below, and other constituent requirements thereof are not particularly limited.

For example, in the case of distinguishing the lithium ion secondary battery by the form and structure, it can be applied to any conventionally known form and structure such as a stacked type (flat type) battery and a wound type (cylindrical type) battery. It is advantageous to employ a stacked type (flat type) battery structure from the viewpoint of cost and workability since long-term reliability can be secured by a simple sealing technique such as thermocompression bonding.

In addition, in the case of considering the electrical connection form (electrode structure) in the lithium ion secondary battery, the lithium ion secondary battery can be applied to both a non-bipolar (internal parallel connection type) battery and a bipolar (internal series connection type) battery.

In the case of distinguishing the lithium ion secondary battery by the type of the electrolyte layer therein, the lithium ion secondary battery can also be applied to batteries having any conventionally known type of electrolyte layer such as a solution electrolyte type battery using a solution electrolyte such as a nonaqueous electrolytic solution in the electrolyte layer and a polymer battery using a polymer electrolyte in the electrolyte layer. The polymer battery is classified into a gel electrolyte type battery using a polymer gel electrolyte (also simply referred to as a gel electrolyte) and a solid polymer (all-solid) type battery using a polymer solid electrolyte (also simply referred to as a polymer electrolyte).

Accordingly, in the following description, a non-bipolar (internal parallel connection type) lithium ion secondary battery using the negative electrode active material for lithium ion secondary battery of the present embodiment will be significantly briefly described with reference to the drawings. However, the technical scope of the lithium ion secondary battery of the present embodiment is not limited to these.

<Overall Structure of Battery>

FIG. 1 is a cross-sectional schematic view which schematically illustrates the overall structure of a flat type (stacked type) lithium ion secondary battery (hereinafter, also simply referred to as the "stacked type battery") of a representative embodiment of the electric device according to the present invention.

As illustrated in FIG. 1, a stacked type battery 10 of the present embodiment has a structure in which a substantially rectangular power generating element 21 in which a charge and discharge reaction actually proceeds is sealed in the interior of a laminate sheet 29 of an outer package. Here, the power generating element 21 is configured to stack a positive electrode in which a positive electrode active material layer 15 is disposed on both sides of a positive electrode current collector 12, an electrolyte layer 17, and a negative electrode in which a negative electrode active material layer 13 is disposed on both sides of a negative electrode current collector 11. Specifically, the negative electrode, the electrolyte layer, and the positive electrode are stacked in this order such that one positive electrode active material layer 15 and the adjacent negative electrode active material layer 13 face each other via the electrolyte layer 17.

By this, the adjacent positive electrode, electrolyte layer, and negative electrode constitute one single battery layer 19. Hence, it can also be said that the stacked type battery 10 illustrated in FIG. 1 has a configuration in which a plurality of single battery layers 19 are stacked to be electrically connected in parallel. Incidentally, the positive electrode active material layer 15 is disposed only on one side of each of the outermost positive electrode current collectors to be positioned at both outermost layers of the power generating element 21, but the active material layer may be provided on both sides thereof. That is, a current collector which has an active material layer only on one side and is thus dedicated to the outermost layer is not prepared but a current collector having an active material layer on both sides may be used as it is as the outermost current collector. In addition, the positive electrode and the negative electrode may be reversely disposed from FIG. 1 so that the outermost negative electrode current collector is positioned at both outermost layers of the power generating element 21, and the negative electrode active material layer may be disposed on one side or both sides of the outermost negative electrode current collector.

A positive electrode current collecting plate 27 and a negative electrode current collecting plate 25 which are electrically connected to the respective electrodes (the positive electrode and the negative electrode) have a structure in which they are respectively attached to the positive electrode current collector 12 and the negative electrode current collector 11 and led to the outside of the laminate sheet 29 so as to be sandwiched between the end portions of the laminate sheet 29. The positive electrode current collecting plate 27 and the negative electrode current collecting plate 25 may be respectively attached to the positive electrode current collector 12 and the negative electrode current collector 11 of the respective electrodes via a positive electrode lead and a negative electrode lead (not illustrated) by ultrasonic welding, resistance welding, or the like if necessary.

The lithium ion secondary battery described above is characterized by a negative electrode. The important constituent members of the battery including the negative electrode will be described below.

<Active Material Layer>

The active material layer 13 or 15 contains an active material, and it further contains other additives if necessary.

[Positive Electrode Active Material Layer]

The positive electrode active material layer 15 contains a positive electrode active material.

(Positive Electrode Active Material)

Examples of the positive electrode active material may include lithium-transition metal composite oxides such as $LiMn_2O_4$, $LiCoO_2$, $LiNiO_2$, $Li(Ni-Mn-Co)O_2$, and those in which a part of these transition metals are substituted with other elements, lithium-transition metal phosphate compounds, and lithium-transition metal sulfate compounds. Depending on the cases, two or more kinds of positive electrode active materials may be used concurrently. A lithium-transition metal composite oxide is preferably used as the positive electrode active material from the viewpoint of capacity and output characteristics. A composite oxide containing lithium and nickel is more preferably used, and Li(Ni—Mn—Co)O$_2$ and those in which a part of these transition metals are substituted with other elements (hereinafter, also simply referred to as the "NMC composite oxide") are still more preferably used. The NMC composite oxide has a layered crystal structure in which a lithium atom layer and a transition metal (Mn, Ni, and Co are orderly disposed) atom layer are alternately stacked via an oxygen atom layer, one Li atom is contained per one atom of the transition metal M, the amount of Li that can be taken out is twofold that of spinel type lithium manganese oxide, that is, the supply ability is twofold, and the NMC composite oxide can thus have a high capacity.

As described above, the NMC composite oxide also includes a composite oxide in which a part of the transition metal elements is substituted with other metal elements. Examples of the other elements in that case may include Ti, Zr, Nb, W, P, Al, Mg, V, Ca, Sr, Cr, Fe, B, Ga, In, Si, Mo, Y, Sn, V, Cu, Ag, and Zn, the other elements are preferably Ti, Zr, Nb, W, P, Al, Mg, V, Ca, Sr, and Cr, the other elements are more preferably Ti, Zr, P, Al, Mg, and Cr, and from the viewpoint of improving the cycle characteristics, the other elements are still more preferably Ti, Zr, Al, Mg and Cr.

The NMC composite oxide preferably has a composition represented by General Formula (1): Li$_a$Ni$_b$Mn$_c$Co$_d$M$_x$O$_2$ (where a, b, c, d, and x satisfy 0.9≤a≤1.2, 0<b<1, 0<c≤0.5, 0<d≤0.5, 0≤x≤0.3, and b+c+d=1. M is at least one kind of element selected from Ti, Zr, Nb, W, P, Al, Mg, V, Ca, Sr, or Cr) since the theoretical discharge capacity is high. Here, a represents the atomic ratio of Li, b represents the atomic ratio of Ni, c represents the atomic ratio of Mn, d represents the atomic ratio of Co, and x represents the atomic ratio of M. From the viewpoint of cycle characteristics, it is preferable that 0.4≤b≤0.6 be satisfied in General Formula (1). Incidentally, the composition of the respective elements can be measured by, for example, inductively coupled plasma (ICP) emission spectrometry.

In general, it is known that nickel (Ni), cobalt (Co), and manganese (Mn) contribute to the capacity and output characteristics from the viewpoint of improving purity of the material and improving electron conductivity. Ti or the like partially substitutes the transition metal in the crystal lattice. From the viewpoint of cycle characteristics, it is preferable that a part of the transition element be substituted with another metal element, and it is particularly preferable that 0<x≤0.3 in General Formula (1). It is considered that the crystal structure is stabilized by a solid solution formed by at least one kind selected from the group consisting of Ti, Zr, Nb, W, P, Al, Mg, V, Ca, Sr, and Cr, and as a result, a decrease in capacity of the battery can be prevented even when charge and discharge are repeated and excellent cycle characteristics can be realized.

As a more preferred embodiment, it is preferable that b, c, and d satisfy 0.44≤b≤0.51, 0.27≤c≤0.31, and 0.19≤d≤0.26 in General Formula (1) from the viewpoint of improving the balance between capacity and lifespan characteristics. For example, LiNi$_{0.5}$Mn$_{0.3}$Co$_{0.2}$O$_2$ has a greater capacity per unit weight as compared to LiCoO$_2$, LiMn$_2$O$_4$, LiNi$_{1/3}$Mn$_{1/3}$Co$_{1/3}$O$_2$, and the like that have been proven in general consumer batteries, can improve the energy density, and thus has an advantage of being able to be used in fabrication of a compact and high capacity battery, and it is also preferable from the viewpoint of the cruising distance. Incidentally, LiNi$_{0.8}$Co$_{0.1}$Al$_{0.1}$O$_2$ is more advantageous from the viewpoint of a greater capacity, but it has a disadvantage from the viewpoint of lifespan characteristics. In contrast, LiNi$_{0.5}$Mn$_{0.3}$Co$_{0.2}$O$_2$ exhibits excellent lifespan characteristics comparable to LiNi$_{1/3}$Co$_{1/3}$O$_2$.

Depending on the cases, two or more kinds of positive electrode active materials may be used concurrently. A lithium-transition metal composite oxide is preferably used as the positive electrode active material from the viewpoint of capacity and output characteristics. Incidentally, it is needless to say that a positive electrode active material other than those described above may be used.

The average particle diameter of the positive electrode active material contained in the positive electrode active material layer 15 is not particularly limited, but it is preferably from 0.01 to 20 μm and more preferably from 1 to 5 μm from the viewpoint of increasing the output. Incidentally, in the present specification, the term "particle diameter" means the longest distance among the distances between arbitrary two points on the contour line of the active material particle (observation plane) to be observed by using an observation means such as a scanning electron microscope (SEM) or a transmission electron microscope (TEM). In addition, in the present specification, as the value of "average particle diameter", a value calculated as an average value of the particle diameters of particles to be observed in several to several tens of visual fields by using an observation means such as a scanning electron microscope (SEM) or a transmission electron microscope (TEM) is adopted. The particle diameter and average particle diameter of other constituent components can also be defined in the same manner.

The positive electrode active material layer 15 can contain a binder.

(Binder)

A binder is added for the purpose of binding the active materials with each other or the active material with the current collector and thus maintaining the electrode structure. The binder to be used in the positive electrode active material layer is not particularly limited, but examples thereof may include the following materials. Thermoplastic polymers such as polyethylene, polypropylene, polyethylene terephthalate (PET), polyether nitrile (PEN), polyacrylonitrile, polyimide, polyamide, polyamide-imide, cellulose, carboxymethyl cellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and any hydrogenated product thereof, and a styrene-isoprene-styrene block copolymer and any hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), and an epoxy resin. Among them, polyvinylidene fluoride, polyimide, styrene-butadiene, carboxymethyl cellulose, polypropylene, polytetrafluoroethylene, polyacrylonitrile, polyamide, and polyamide-imide are more preferable. These suitable binders exhibit excellent heat resistance, further have a significantly wide potential window, are stable to both the positive electrode potential and the negative electrode potential, and can be thus used in the active material layer. These binders may be used singly or two or more kinds thereof may be used concurrently.

The amount of binder contained in the positive electrode active material layer is not particularly limited as long as it is an amount in which the active material can be bound, but it is preferably from 0.5 to 15% by mass and more preferably from 1 to 10% by mass with respect to the active material layer.

The positive electrode (positive electrode active material layer) can be formed by any method of a kneading method, a sputtering method, a vapor deposition method, a CVD method, a PVD method, an ion plating method, or a thermal spraying method in addition to an ordinary method to coat a slurry.

[Negative Electrode Active Material Layer]

The negative electrode active material layer 13 contains a negative electrode active material.

(Negative Electrode Active Material)

In the present embodiment, the negative electrode active material is formed of a silicon-containing alloy having a composition represented by the following Chemical Formula (I).

[Chemical Formula 4]

$$Si_xSn_yM_zA_a \quad (I)$$

In Chemical Formula [[(1)]](I) above, A is unavoidable impurities,

M is one or two or more transition metal elements, x, y, z, and a represent values of percent by mass, and 0<x<100, 0<y<100, 0<z<100, and 0≤a<0.5 and x+y+z+a=100.

As it is apparent from Chemical Formula (I) above, the silicon-containing alloy is a ternary system of Si, Sn, and M (transition metal) in the present embodiment. Excellent cycle durability can be exerted as the silicon-containing alloy is a ternary system of Si, Sn, and M in this manner. In addition, although the reason is uncertain, it is considered that a ternary system of Si, Sn, and M makes it easier to form a silicide phase having an aspect ratio of 3 or more. In addition, in the present specification, the term "unavoidable impurities" means those that are present in the raw material or have been unavoidably mixed into the Si-containing alloy during the production process. The unavoidable impurities are not originally required, but they are in a trace amount and do not affect the characteristics of the Si alloy, and they are thus allowable impurities.

In the present embodiment, M in Formula (I) above may be one or two or more transition metal elements, and the kind of the transition metal is not particularly limited. It is preferably at least one kind selected from the group consisting of Ti, Zr, Ni, Cu, and Fe, it is more preferably Ti or Zr, and it is particularly preferably Ti. The silicides formed of these elements have higher electron conductivity than silicides of other elements and a high strength. In particular, $TiSi_2$ of a silicide in a case in which the transition metal element is Ti is preferable since it exhibits significantly excellent electron conductivity. That is, it is possible to even further suppress the phase transition between an amorphous state and a crystalline state at the time of alloying Si with Li and thus to improve the cycle lifespan particularly by selecting Ti as an additive element (M in Formula (I) above) to the negative electrode active material (silicon-containing alloy) and adding Sn as a second additive element in the present embodiment. In addition, by this, a negative electrode active material is formed to have a higher capacity than a conventional negative electrode active material (for example, carbon-based negative electrode active material). Hence, according to a preferred embodiment of the present invention, it is preferable that M be titanium (Ti) in the composition represented by Chemical Formula (I) above.

Here, the reason for suppressing the phase transition between an amorphous state and a crystalline state at the time of alloying Si with Li is because transition from an amorphous state to a crystalline state occurs to cause a great change in volume (about fourfold) at the time of alloying Si with Li in an Si material and thus the particles themselves are broken and lose the function as an active material. Hence, by suppressing the phase transition between an amorphous state and a crystalline state, it is possible to suppress collapse of the particles themselves, to maintain the function (high capacity) as an active material, and also to improve the cycle lifespan. By selecting such an additive element, it is possible to provide an Si alloy negative electrode active material having a high capacity and high cycle durability.

In the composition of Chemical Formula (I) above, the composition ratio z of the transition metal M (particularly Ti) is preferably 7<z<100, more preferably 10<z<100, still more preferably 15<z<100, and particularly preferably 20≤z<100. By setting the composition ratio z of the transition metal M (particularly Ti) to be in such a range, the cycle characteristics can be even further improved.

More preferably, x, y, and z in Chemical Formula (I) satisfy the following Mathematical Formula (1) or (2).

[Mathematical Formula 1]

$$35 \leq x \leq 78, 7 \leq y \leq 30, 0 < z \leq 37 \quad (1)$$

$$35 \leq x \leq 52, 30 \leq y \leq 51, 0 < z \leq 35 \quad (2)$$

An initial discharge capacity exceeding 1000 Ah/g can be obtained and the cycle lifespan can also exceed 90% (50 cycles) when the contents of the respective components are in the above ranges.

Incidentally, it is desirable to set the content of the transition metal M (particularly Ti) to be in a range of more than 7% by mass from the viewpoint of attaining further improvement in characteristics of the negative electrode active material. That is, it is preferable that x, y, and z satisfy the following Mathematical Formula (3) or (4).

[Mathematical Formula 2]

$$35 \leq x \leq 78, 7 \leq y \leq 30, 7 < z \leq 37 \quad (3)$$

$$35 \leq x \leq 52, 30 \leq y \leq 51, 7 < z \leq 35 \quad (4)$$

This makes it possible to even further improve the cycle characteristics.

Moreover, it is preferable that x, y, and z satisfy the following Mathematical Formula (5) or (6) from the viewpoint of securing more favorable cycle durability.

[Mathematical Formula 3]

$$35 \leq x \leq 68, 7 \leq y \leq 30, 18 \leq z \leq 37 \quad (5)$$

$$39 \leq x \leq 52, 30 \leq y \leq 51, 7 < z \leq 20 \quad (6)$$

Moreover, it is preferable that x, y, and z satisfy the following Mathematical Formula (7) in the negative electrode active material of the present embodiment from the viewpoints of initial discharge capacity and cycle durability.

[Mathematical Formula 4]

$$46 \leq x \leq 58, 7 \leq y \leq 21, 24 \leq z \leq 37 \quad (7)$$

Incidentally, as described above, A is impurities derived from raw materials and the production method (unavoidable impurities) other than the three components described above. a is $0 \leq a < 0.5$ and preferably $0 \leq a < 0.1$.

Incidentally, it is possible to confirm whether the negative electrode active material (silicon-containing alloy) has the composition of Chemical Formula (I) above or not through qualitative analysis by X-ray fluorometry (XRF) and quantitative analysis by inductively coupled plasma (ICP) emission spectrometry.

In the present embodiment, a lattice image of the silicon-containing alloy obtained by using a transmission electron microscope (TEM) is subjected to Fourier transform processing to obtain a diffraction pattern, and a distance between Si regular tetrahedrons is 0.39 nm or more when the distance between Si regular tetrahedrons in an amorphous region is calculated from a Fourier image obtained by subjecting a diffraction ring portion present in a width of from 0.7 to 1.0 when the distance between Si regular tetrahedrons is 1.0 in this diffraction pattern to inverse Fourier transform, and the size of periodic array region (MRO) is 30 nm or less. This requirement will be described below.

(Lattice Image of Silicon-Containing Alloy Obtained by TEM)

A lattice image of silicon-containing alloy (negative electrode active material) particles (observation plane) of the silicon-containing alloy to be observed by using a transmission electron microscope (TEM; observation means) is obtained. Observation (measurement) of the silicon-containing alloy through a transmission electron microscope (TEM; observation unit) can be conducted by the following method, but the method is not limited to such a method.

First, an electron microscope system for acquiring an observation image by observing the silicon-containing alloy (negative electrode active material) particles of a sample to be observed will be described. In this electron microscope system, an observation image, namely, an electron microscopy image is acquired by observing a sample to be observed through a transmission electron microscope (TEM).

In the following description, observation using a transmission electron microscope will be described. However, the electron microscope method is not limited to a method using a transmission electron microscope, and various kinds of transmission electron microscopes such as a scanning transmission electron microscope and a high angle scattering annular dark field scanning transmission electron microscope (HAADF-STEM) can be used.

The observation using a transmission electron microscope can be usually conducted by using a TEM and a computer. In the observation using a TEM, it is possible to utilize a technique in which an electron beam is applied to the sample to be observed and the lattice image (interference image) produced by the electrons transmitted through the sample to be observed is enlarged and observed (monitored) by a computer. According to a transmission electron microscope (TEM), it is possible to acquire an observation image which is enlarged to an atomic level and have a high resolution and a high contrast. FIG. 2 is an enlarged view of a lattice image of the silicon-containing alloy of the present embodiment (more specifically, one fabricated in Example 3) obtained by using a transmission electron microscope (TEM).

(Diffraction Pattern)

Next, the lattice image obtained by using a TEM is subjected to Fourier transform processing to obtain a diffraction pattern. The Fourier transform processing can be conducted, for example, by software "Digital Micrograph Ver. 3.6.0" developed by Gatan, Inc. Incidentally, for Fourier transform processing of the lattice image obtained by using a TEM, other general-purpose software that can be easily reproduced (implemented) by those skilled in the art may be used.

Next, an analysis method for obtaining the diffraction pattern of the present embodiment will be described.

Hereinafter, an analysis method for obtaining a diffraction pattern using a lattice image (electron microscopy image) obtained by observing the silicon-containing alloy (negative electrode active material) of a sample to be observed through a transmission electron microscope (TEM) as an observation image of a sample to be observed for obtaining a diffraction pattern will be described.

Figures 2A, 2B, 2C:
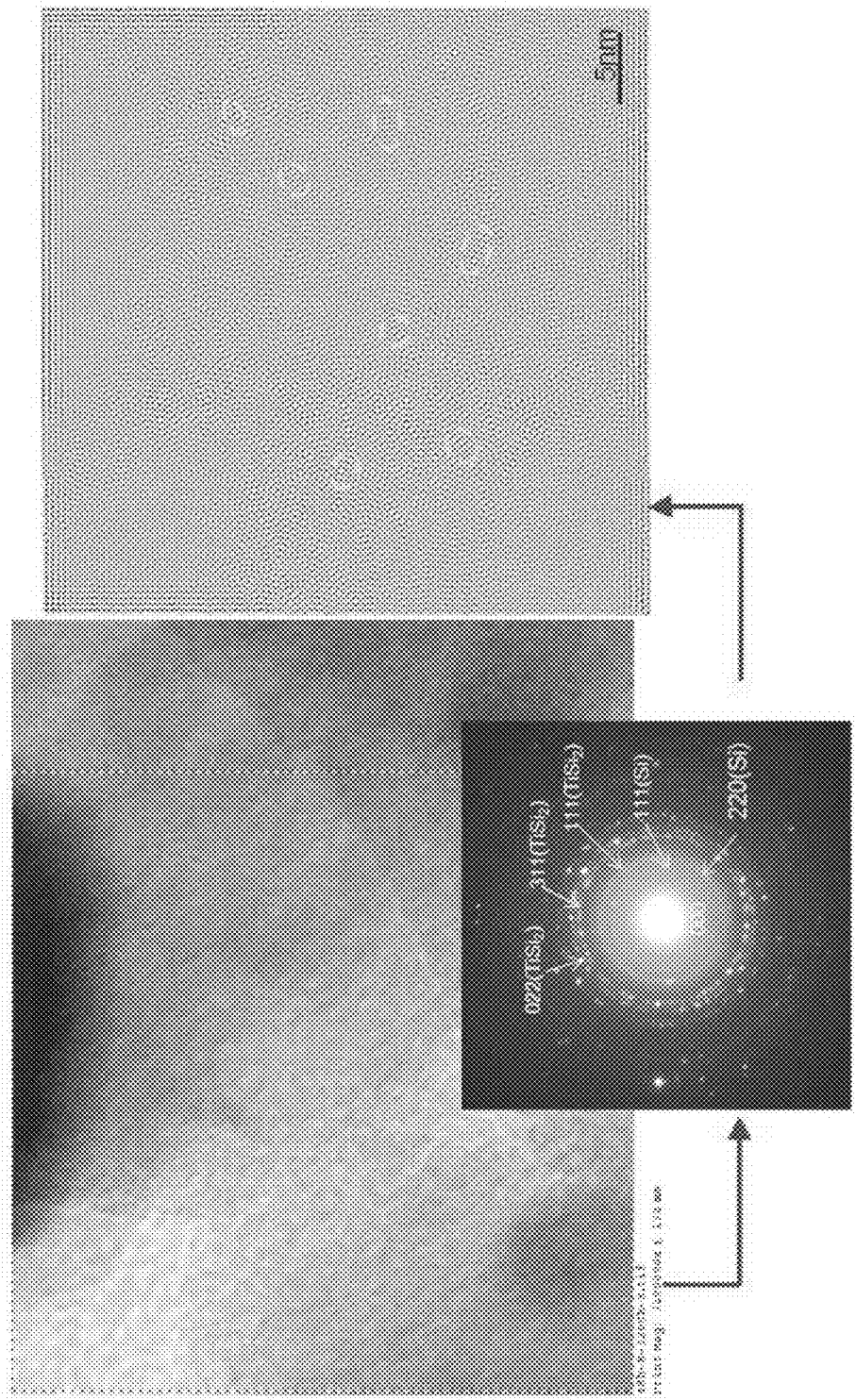
FIG. 2(A) is an enlarged view of a lattice image of a silicon-containing alloy (more specifically, one fabricated in Example 3) of the present embodiment obtained by using a transmission electron microscope (TEM).
FIG. 2(B) is a diffraction pattern acquired by subjecting a lattice image (TEM image) of an observation image to fast Fourier transform.
FIG. 2(C) is a view which illustrates a Fourier image obtained by subjecting an extracted pattern obtained by extracting data of a diffraction ring portion corresponding to the Si (220) plane in FIG. 2(B) to inverse fast Fourier transform.

First, a lattice image (observation image) of the silicon-containing alloy (negative electrode active material) is acquired (see FIG. 2(A)).

FIG. 2(A) is a lattice image (observation image) of a sample to be observed by a TEM. FIG. 2(A) illustrates a TEM image (lattice image; observation image) when silicon-containing alloy (negative electrode active material) particles are observed through a TEM by using the silicon-containing alloy (negative electrode active material) fabricated in Example 3 as a sample to be observed.

In the TEM image illustrated in FIG. 2(A), there are a bright portion and a dark portion. The bright portion corresponds to the portion at which an atomic row is present and the dark portion corresponds to the portion between an atomic row and another atomic row.

Subsequently, a portion (the portion enclosed by a broken line frame) in 40 nm on every side of the lattice image (TEM image) illustrated in FIG. 2(A) is subjected to Fourier transform. Here, a diffraction pattern (diffraction data) including a plurality of diffraction spots corresponding to a plurality of atomic planes is acquired by subjecting the scope enclosed by a broken line frame of the acquired lattice image (TEM image) to Fourier transform (FT). This Fourier transform processing can be conducted, for example, by software "Digital Micrograph Ver. 3.6.0" developed by Gatan, Inc. Incidentally, for this Fourier transform processing, other general-purpose software that can be easily reproduced (implemented) by those skilled in the art may be used.

FIG. 2(B) is a diffraction pattern acquired by subjecting a lattice image (TEM image) of an observation image to fast Fourier transform. FIG. 2(B) illustrates a diffraction pattern acquired by subjecting a portion enclosed by a red frame of the observation image illustrated in FIG. 2(A), namely, a lattice image (TEM image) when silicon-containing alloy particles are observed through a TEM by using a silicon-containing alloy (more specifically, one fabricated in Example 3) as a sample to be observed to Fourier transform.

In the diffraction pattern illustrated in FIG. 2(B), as the intensity indicating the absolute value, a plurality of diffraction ring portions (diffraction spots) are observed in a ring shape (annular shape) around the brightest spot seen at the center.

In the diffraction pattern illustrated in FIG. 2(B), the diffraction ring portion present in a width of from 0.7 to 1.0 when the distance between Si regular tetrahedrons is 1.0 is determined. Here, the distance between Si regular tetrahedrons corresponds to the distance (also simply referred to as the distance between Si and Si) between the central Si atom of an Si tetrahedral structure and the central Si atom of another Si regular tetrahedral structure. Incidentally, this distance corresponds to the interplanar spacing of the Si (220) plane in the Si diamond structure. From this, in this step S13, the diffraction ring portion corresponding to the Si (220) plane among the plurality of diffraction ring portions (diffraction spots) is assigned, and this diffraction ring portion is regarded as the diffraction ring portion present in a width of from 0.7 to 1.0 when the distance between Si regular tetrahedrons is 1.0. For the assignment of the diffraction ring portion (diffraction line), for example, it is possible to use known literatures (official dispatches, academic books, and the like) and literatures on various kinds of electron diffraction lines of silicon open to the public on the internet. For example, it is possible to conduct the assignment with reference to the literatures on the electron diffraction lines of silicon such as Nagoya University Graduate School of Engineering and Faculty of Engineering "Technical Review", Vol. 9, March 2007, I. Technical workshop of engineering department 8. Acquisition of technology on electron diffraction pattern observation through transmission electron microscope, SAITO Noriyuki, ARAI Shigeo, Graduate School of Engineering and Faculty of Engineering and Technology, Department of Materials and Analysis Technology (http://etech.engg.nagoya-u.ac.jp/gihou/v9/047.pdf) open to the public on the internet.

(Fourier Image)

Subsequently, the diffraction ring portion present in a width of from 0.7 to 1.0 when the distance between Si regular tetrahedrons is 1.0 of the diffraction pattern, namely, the diffraction ring portion corresponding to the Si (220) plane is subjected to inverse Fourier transform. A Fourier image (inverse Fourier transform data) is acquired by subjecting (the extracted pattern and extracted data obtained by extracting data of) this diffraction ring portion corresponding to this Si (220) plane to inverse Fourier transform. The inverse Fourier transform processing can be conducted, for example, by software "Digital Micrograph Ver. 3.6.0" developed by Gatan, Inc. Incidentally, for this inverse Fourier transform processing, other general-purpose software that can be easily reproduced (implemented) by those skilled in the art may be used.

FIG. 2(C) is a view which illustrates a Fourier image obtained by subjecting an extracted pattern obtained by extracting data of the diffraction ring portion corresponding to the Si (220) plane in FIG. 2(B) to inverse fast Fourier transform. As illustrated in FIG. 2(C), a bright and dark design composed of a plurality of bright portions (bright portions) and a plurality of dark portions (dark portions) is observed on the Fourier image thus obtained. Most of the bright portions and dark portions are amorphous regions (amorphous Si regions) which are irregularly disposed without being periodically arranged. However, as illustrated in FIG. 2(C), a so-called "region having a periodic array" in which bright portions are periodically arranged (periodic array portion present in an ellipse enclosed by a broken line in the drawing) is disseminated (scattered).

That is, in the amorphous region other than the periodic array portion present in the ellipse enclosed by a broken line in the Fourier image illustrated in FIG. 2(C), a bright portion and a dark portion are not linearly stretched but bent in the middle and are not also regularly arranged side by side. In addition, there is also a portion at which the brightness contrast between a bright portion and a dark portion is weakened. Such a structure of the bright and dark design composed of a bright portion and a dark portion in the amorphous region other than the periodic array portion present in the ellipse enclosed by a broken line indicates that the sample to be observed has an amorphous or microcrystalline (precursor of MRO) structure in the amorphous region. That is, it is possible to easily analyze whether there is a region (crystallized region or crystalline structure region) having a periodic array present in the ellipse enclosed by a broken line in the amorphous region or not by acquiring a Fourier image. In other words, it can be said that it is an amorphous region except for a region having a periodic array.

The "region having a periodic array" means a region in which at least two or more rows of at least three bright portions that are continuously disposed in an approximately straight line are regularly disposed side by side. It is indicated that the sample to be observed has a crystalline structure in this region having a periodic array. That is, the "region having a periodic array" indicates a crystallized (crystalline structure) region disseminated (scattered) in the amorphous Si region occupying the greater part of the Fourier image. Hence, in the present embodiment, the "amorphous region" refers to a region other than the "region having a periodic array (crystallized region or crystalline structure region)" defined above.

In the present embodiment, the "distance between Si regular tetrahedrons when a distance between Si regular tetrahedrons in an amorphous region is calculated," is determined as follows. For example, an arbitrary region in 20 nm on every side (in a visual field of 20×20 nm) is secured (selected) in a region which does not include the region having a periodic array present in the ellipse enclosed by a broken line in FIG. 2(C), and the number of bright portions (corresponding to dots=Si regular tetrahedral units) in this region of visual field is measured. Next, a value obtained by dividing (fractioning) 20 nm that is the length of one side of the visual field by the square root of the number of bright portions is adopted as the distance between Si regular tetrahedrons. For example, 20 nm÷√(100)=20 nm/10=2 nm is the distance between Si regular tetrahedrons when the number of bright portions (corresponding to dots=Si regular tetrahedral units) in an arbitrary region of visual field in 20 nm on every side is 100.

(Distance between Si Regular Tetrahedrons)

In the present embodiment, the distance between Si regular tetrahedrons in an amorphous region is 0.39 nm or more. The distance is preferably 0.42 nm or more and more preferably 0.48 nm or more. This is because it is possible to provide an Si alloy active material capable of facilitating the movement of Li ions at the time of charge and discharge and greatly improving the durability as the distance between Si regular tetrahedrons in an amorphous region satisfies the above range. It is possible to promote the amorphization and to extend the distance between Si regular tetrahedrons (distance between Si and Si) in an amorphous region in the Si alloy active material as the distance between Si regular tetrahedrons in an amorphous region satisfies the above range (requirement). This makes it possible for Li ions to be easily intercalated into and deintercalated from the extended space between Si and Si and to greatly improve the durability of the negative electrode and electric device using the negative electrode active material of the present embodiment. It is possible to have a capacity retention rate of 40% or more after 50 cycles particularly when the distance between Si regular tetrahedrons in an amorphous region is 0.39 nm or more. In addition, it is possible to have a capacity retention rate of 53% or more after 50 cycles when the distance between Si regular tetrahedrons in an amorphous region is 0.42 nm or more. In addition, it is excellent that the distance between Si regular tetrahedrons in an amorphous region is 0.48 nm or more from the viewpoint of being able to have a capacity retention rate of 76% or more (maximum 96% in Examples) after 50 cycles. Incidentally, the upper limit of the distance between Si regular tetrahedrons in an amorphous region is not particularly limited, but it can be said that the upper limit is 0.55 nm or less from the theoretical point of view. The distance between regular tetrahedrons extends only to about 0.43 nm even though Si is amorphized. In the present embodiment, experimental data (Examples) exceeding this range is confirmed, and it is considered that further expansion proceeds by the substitution effect of Sn having a larger atomic radius although the reason for this is uncertain.

(Intensity Ratio of Diffraction Peak)

In the X-ray diffraction measurement of the silicon-containing alloy of the present embodiment using the CuKaI ray, the ratio value (B/A) of a diffraction peak intensity B of a silicide of a transition metal in a range of 2θ=37 to 45° to a diffraction peak intensity A of the (111) plane of Si in a range of 2θ=24 to 33° is preferably 0.41 or more. This ratio value (B/A) is preferably 0.89 or more, more preferably 2.55 or more, and particularly preferably 7.07 or more. Incidentally, the apparatus and conditions used for the X-ray diffraction analysis (measurement method) for calculating the intensity ratio of the diffraction peak are as follows.

Name of apparatus: X-ray diffractometer (SmartLab 9 kW) manufactured by Rigaku Corporation Voltage and current: 45 kV and 200 mA X-ray wavelength: CuKα1.

Here, the diffraction peak intensity A of the (111) plane of Si in a range of 2θ=24 to 33° can be determined as follows.

First, in the diffraction spectrum obtained by X-ray diffraction analysis, the point at which a perpendicular line at 2θ=24° intersects with the diffraction spectrum is taken as a. In the same manner, the point at which a perpendicular line at 2θ=33° intersects with the X-ray diffraction spectrum is taken as b. Here, a line segment ab is taken as the base line, and the point at which a perpendicular line at the diffraction peak (2θ=about 28.5°) of the (111) plane of Si intersects with the base line is taken as c. Thereafter, the diffraction peak intensity A of the (111) plane of Si can be determined as the length of a line segment cd connecting a vertex d of the diffraction peak (2θ=about 28.5°) of the (111) plane of Si and the point c.

In the same manner, the diffraction peak intensity B of a silicide of a transition metal in a range of 2θ=37 to 45° can be determined as follows. A case in which a silicide of a transition metal is $TiSi_2$ will be described below as an example.

First, in the diffraction spectrum obtained by X-ray diffraction analysis, the point at which a perpendicular line at 2θ=37° intersects with the diffraction spectrum is taken as e. In the same manner, the point at which a perpendicular line at 2θ=45° intersects with the X-ray diffraction spectrum is taken as f. Here, a line segment ef is taken as the base line, and the point at which a perpendicular line of the diffraction peak (2θ=about 39°) of $TiSi_2$ intersects with the base line is taken as g. Thereafter, the diffraction peak intensity B of $TiSi_2$ can be determined as the length of a line segment gh connecting a vertex h of the diffraction peak (2θ=about 39°) of $TiSi_2$ and the point g.

Here, the specific value of each of the diffraction peak intensity A of the (111) plane of Si and the diffraction peak intensity B of a silicide of a transition metal is not particularly limited, but the diffraction peak intensity A of the (111) plane of Si is preferably from 6000 to 25000 (cps) and more preferably from 6000 to 15000 (cps). In addition, the diffraction peak intensity B of a silicide of a transition metal is preferably from 9000 to 46000 (cps) and more preferably from 25000 to 46000 (cps). There is an advantage of being easy to reliably achieve the intensity ratio (B/A) of diffraction peaks described above when A and B are controlled to have values in these ranges.

(Average Particle Diameter of Silicon-Containing Alloy)

The particle diameter of the silicon-containing alloy constituting the negative electrode active material in the present embodiment is not particularly limited, but the average particle diameter is preferably from 0.1 to 20 μm and more preferably from 0.2 to 10 μm.

In the present embodiment, the negative electrode active material preferably further contains an alloy having a first phase containing silicon which forms the parent phase as a main body and a second phase which contains a transition metal and silicon and is adjacent to the first phase. That is, the negative electrode active material of the present embodiment is preferably composed of a silicon-containing alloy having a predetermined composition and a structure in which a silicide phase (second phase) containing a silicide of a transition metal is dispersed in a parent phase (first phase) containing amorphous or low crystalline silicon as a main component.

As described above, the silicon-containing alloy constituting the negative electrode active material in the present embodiment is equipped with a parent phase containing amorphous or low crystalline silicon as a main component. An electric device having a high capacity and excellent cycle durability can be provided when silicon constituting the parent phase is amorphous or low crystalline in this manner. Incidentally, the size of periodic array region is a feature on the periodic array region (MRO) scattered (disseminated) in the so-called amorphous phase occupying the greater part of the parent phase (first phase) described above.

The parent phase constituting the silicon-containing alloy may be a phase containing silicon as a main component, and it is preferably an Si single phase (phase composed only of Si). This parent phase (a phase containing Si as a main component) is a phase involved in occlusion and release of lithium ions at the time of operation of the electric device (lithium ion secondary battery) of the present embodiment, and it is a phase capable of electrochemically reacting with Li. In the case of an Si single phase, it is possible to occlude and release a large amount of Li per unit weight and unit volume. However, since Si exhibits poor electron conductivity, the parent phase may thus contain trace amounts of additive elements such as phosphorus and boron, transition metals, and the like. Incidentally, it is preferable that the parent phase (a phase containing Si as a main component) be amorphized more than the silicide phase to be described later. By employing such a configuration, the negative electrode active material (silicon-containing alloy) can be formed to have a higher capacity. Incidentally, it is possible to confirm whether the parent phase is more amorphous than the silicide phase or not by electron diffraction analysis. Specifically, according to electron diffraction analysis, a net pattern (lattice-shaped spot) of a two-dimensional point array is obtained for a single crystal phase, the Debye-Scherrer ring (diffraction ring) is obtained for a polycrystalline phase, and a halo pattern is obtained for an amorphous phase. The above confirmation is possible by utilizing this.

Meanwhile, in addition to the parent phase, the silicon-containing alloy constituting the negative electrode active material according to the present embodiment also contains a silicide phase which is dispersed in the parent phase and contains a silicide (also referred to as a silicide) of a transition metal. This silicide phase contains a silicide of a transition metal (for example, $TiSi_2$) so as to exhibit excellent affinity for the parent phase and to be able to suppress cracking at the crystal interface particularly due to volume expansion at the time of charge. Furthermore, the silicide phase is superior to the parent phase in electron conductivity and hardness. For this reason, the silicide phase improves low electron conductivity of the parent phase and also plays a role of maintaining the shape of the active material against the stress at the time of expansion.

A plurality of phases may be present in the silicide phase, and, for example, two or more phases having different composition ratios of the transition metal element M to Si (for example, $MSi_2$ and MSi) may be present. In addition, two or more phases may be present by containing silicides of different transition metal elements. Here, the kind of the transition metal contained in the silicide phase is not particularly limited, but it is preferably at least one kind selected from the group consisting of Ti, Zr, Ni, Cu, and Fe, more preferably Ti or Zr, and particularly preferably Ti. The silicides formed of these elements have a higher electron conductivity than silicides of other elements and a high strength. In particular, $TiSi_2$ of a silicide in a case in which the transition metal element is Ti is preferable since it exhibits significantly excellent electron conductivity.

Particularly, in a case in which the transition metal element M is Ti and two or more phases (for example, $TiSi_2$ and TiSi) having different composition ratios are present in the silicide phase, a $TiSi_2$ phase is 50% by mass or more, preferably 80% by mass or more, more preferably 90% by mass or more, particularly preferably 95% by mass or more, and most preferably 100% by mass of the silicide phase.

The size of the silicide phase is not particularly limited, but the size of the silicide phase is 50 nm or less in a preferred embodiment. By employing such a configuration, the negative electrode active material (silicon-containing alloy) can be formed to have a higher capacity.

In order to judge whether it is a silicon-containing alloy which constitutes the negative electrode active material and has a structure having the parent phase (first phase) and the silicide phase (second phase) or not, the presence or absence of a diffraction spot exhibiting crystallinity of the silicide phase may be confirmed by conducting the electron diffraction measurement using the following measuring apparatus under the following conditions. The presence of such a spot proves the presence of a silicide phase. In addition, in order to judge whether the parent phase is amorphous or low crystalline or not, it is effective to confirm the presence or absence of a so-called "halo pattern" in which the diffraction image is wide and unclear in the same electron diffraction measurement, and the presence of a halo pattern proves that the parent phase is amorphous or low crystalline (most of it is amorphous region).

(Electron Diffraction Measurement)
1) Apparatus: Field emission type electron microscope (JEM 2100F manufactured by JEOL Ltd.)
  Image acquisition: Digital Micrograph
2) Measurement conditions: acceleration voltage=200 kV
  Beam diameter=about 1.0 nm $\phi$.

(Aspect Ratio of Silicon-Containing Alloy)
In the present embodiment, in the silicon-containing alloy constituting the negative electrode active material, it is desirable that the silicide phase having an aspect ratio of 3 or more (having a certain anisotropic shape) is present at a proportion of 2% or more with respect to the total number of silicide phases contained in the alloy. The silicide phase having the aspect ratio of 3 or more (having an anisotropic shape) is more preferably present at a proportion of 7% or more and still more preferably present at a proportion of 9.1% or more. Incidentally, the upper limit of the presence proportion of the silicide phase having the aspect ratio of 3 or more is not particularly limited, but it is preferably 50% or less and more preferably 30% or less in consideration of a decrease in productivity accompanying an increase in time for the alloying treatment. As described above, the silicide phase exhibits excellent electron conductivity (electric conductivity), and an electric conductive network in the silicon-containing alloy can be thus favorably formed as a silicide phase having an aspect ratio of 3 or more is present at a specific proportion or more. By this, the electric conductive network is maintained and it is possible to prevent the part involved in occlusion and release of lithium ions from decreasing even in a case in which the silicon-containing alloy expands and contracts in the course of charge and discharge of the electric device. As a result, it is possible to improve cycle durability of the electric device. Incidentally, the aspect ratio of the silicide phase and the presence proportion of the silicide phase having an aspect ratio of 3 or more in the silicon-containing alloy can be determined by analyzing the image of the alloy cross section to be obtained by a technique such as energy dispersive X-ray spectrometry (EDX analysis) or high angle annular dark field scanning TEM (HAADF-STEM).

In addition, from the viewpoint of even further improving the cycle durability of the electric device, the volume fraction of the silicide phase in the silicon-containing alloy constituting the negative electrode active material in the present embodiment is preferably 30% or more. It is more preferably 40% or more, still more preferably 43.5% or more, particularly preferably 50% or more, and most preferably 67.3% or more. Incidentally, the upper limit of the volume fraction is not particularly limited, but it is preferably 90% or less and more preferably 80% or less in consideration of the Li occlusion and release ability per unit weight and unit volume of the silicon-containing alloy. In this manner, as the volume fraction of the silicide phase in the silicon-containing alloy is set to a predetermined proportion, the electric conductive network in the silicon-containing alloy is even more favorably formed and cycle characteristics in a higher level can be attained in the electric device. Incidentally, the volume fraction of the silicide phase in the silicon-containing alloy can be determined by analyzing the image of the alloy cross section to be obtained by a technique such as EDX analysis or HAADF-STEM.

Furthermore, in the silicon-containing alloy in the present embodiment, the closest distance between adjacent silicide phases is preferably 5 nm or less, more preferably 3 nm or less, and still more preferably 1 nm or less from the viewpoint of further improving cycle durability of the electric device. The lower limit value of the closest distance is not particularly limited. The tunnel current is likely to flow between the silicide phases when the closest distance between the silicide phases is in the above range, and an electric conductive network in the alloy is thus likely to be secured. As a result, cycle characteristics in a higher level can be achieved in the electric device. Here, in the present specification, the "closest distance between adjacent silicide phases" means the distance (shortest distance) between adjacent silicide phases in the cross section of the alloy. In the present invention, it is sufficient that one combination of adjacent silicide phases having a closest distance in the above range is present. As a preferred embodiment, preferably 10% or more, more preferably 30% or more, still more preferably 50% or more, yet still more preferably 70% or more, particularly preferably 90% or more, and most preferably 100% of the combinations of adjacent silicide phases satisfy the above numerical range. Incidentally, the closest distance between adjacent silicide phases in the silicon-containing alloy can be determined by analyzing the image of the alloy cross section to be obtained by a technique such as EDX analysis or HAADF-STEM.

The textural structure of the silicon-containing alloy constituting the negative electrode active material in the present embodiment can be analyzed by using a technique such as EDX analysis or HAADF-STEM.

Here, EDX analysis is an element analysis method in which characteristic X-rays or fluorescent X-rays generated when a material is irradiated with a primary ray such as an electron beam, an X-ray, or the like are detected by an energy dispersive detector such as a semiconductor detector and the elements constituting the material and the concentration thereof are investigated from the energy and intensity thereof.

In addition, "HAADF-STEM" is a technique of obtaining an image of a sample by irradiating the sample with a narrowed electron beam while scanning it and detecting the electrons scattered at a high angle among the transmitted electrons by a circular detector. In the present specification, a HAADF-STEM image is obtained under the following conditions.

(Sample Preparation)
FIB (Focused Ion Beam) Method: Micro sampling system (FB-2000A manufactured by Hitachi, Ltd.)
Al grid used
(Apparatus and Condition for Measurement)
1) Apparatus: Atomic resolution analysis electron microscope (JEM-ARM 200F manufactured by JEOL, Ltd.)
JED-2300 (100 mm$^2$ silicon drift (SDD) model) manufactured by JEOL, Ltd.
System: Analysis Station
Image acquisition: Digital Micrograph
2) Measurement condition: acceleration voltage=200 kV
Beam diameter=about 0.2 mm $\phi$
Energy resolution=about 0.5 eV FWHM.

In the present embodiment, it is possible to observe the dispersion state of the silicide phase in the parent phase by subjecting the image of the textural structure of the alloy cross section to be obtained by the technique such as EDX analysis or HAADF-STEM described above to image processing.

(Method of Producing Negative Electrode Active Material)

The method of producing the negative electrode active material for electric device according to the present embodiment is not particularly limited, and conventionally known knowledge can be appropriately referred to. In the present embodiment, as an example of a production method for setting the size of periodic array region determined by image analysis using a TEM image of the silicon-containing alloy or the like to be in the range as described above, a production method including the following steps is provided.

First, a step of mixing raw materials of the silicon-containing alloy to obtain a mixed powder is carried out. In this step, the raw materials of the alloy are mixed in consideration of the composition of the negative electrode active material (silicon-containing alloy) to be obtained. As the raw materials of the alloy, the form and the like thereof are not particularly limited as long as the ratio of elements required as a negative electrode active material can be realized. For example, it is possible to use one obtained by mixing simple substances of elements constituting the negative electrode active material at the intended ratio or an alloy, a solid solution, or an intermetallic compound having the intended element ratio. In addition, raw materials in a powder form are usually mixed. By this, a mixed powder composed of raw materials is obtained. It is possible to obtain a silicon-containing alloy having a composition represented by Chemical Formula (I) above by adjusting the composition ratio of silicon (Si), tin (Sn), and transition metal element (for example, titanium (Ti)) in the raw materials. In addition to this, the intensity ratio (B/A) of the diffraction peak can be controlled. For example, it is possible to increase the intensity ratio (B/A) by increasing the composition ratio of Ti to Si. Incidentally, in order to have a distance between Si regular tetrahedrons in an amorphous region in the range as described above, it is not enough to adjust only the composition ratio and the following alloying treatment (step) is important (see Examples).

Subsequently, the mixed powder obtained above is subjected to an alloying treatment (step). By this, a silicon-containing alloy that can be used as a negative electrode active material for electric device is obtained.

As a method of alloying treatment, there are a solid phase method, a liquid phase method, and a vapor phase method, but examples thereof may include a mechanical alloying method, an arc plasma melting method, a casting method, a gas atomizing method, a liquid quenching method, an ion beam sputtering method, a vacuum deposition method, a plating method, and a vapor phase chemical reaction method. Among them, it is preferable to conduct the alloying treatment by using the mechanical alloying method. It is preferable to conduct the alloying treatment by using the mechanical alloying method since it is possible to easily control the state of the phase. In addition, a step of melting the raw materials or a step of quenching and solidifying the molten material thus molten may be included before the alloying treatment. In addition, as the alloying treatment (step), a step of quenching and solidifying the molten material obtained by melting the raw materials may be carried out by a cooling and rapid solidification method (see Example 5). Furthermore, as the alloying treatment, an alloying treatment (1) is may be first conducted by a step of quenching and solidifying the molten material obtained by melting the raw materials by a cooling and rapid solidification method and an alloying treatment (2) may be further conducted using the mechanical alloying method or the like described above (see Example 4). In the alloying treatment (2) after the alloying treatment (1), the distance between Si regular tetrahedrons (the size of the crystallization region) in an amorphous region is slightly larger as can be seen from Example 5 including only the alloying treatment (1) and Example 4 including the alloying treatment (1)+the alloying treatment (2). From this, it can be seen that the distance between Si and Si in an amorphous region increases, so that intercalation and deintercalation of Li into the space between Si and Si is likely to occur. For this reason, it is possible to improve the durability (see the comparison of capacity retention rate between Examples 4 and 5). Furthermore, as can be seen from Example 1 including only the alloying treatment (2) and from Example 4 including the alloying treatment (1)+alloying treatment (2), the silicon-containing alloy subjected only to the alloying treatment (2) is superior to the silicon-containing alloy subjected to the alloying treatment (1)+alloying treatment (2) in the capacity retention rate although the distance between Si regular tetrahedrons is the same. It is likely that this is because it is possible to scatter the crystallized region (MRO) having a smaller size in the amorphous region and to alleviate the expansion of Si particles at the time of charge and discharge in the silicon-containing alloy subjected only to the alloying treatment (2) by the mechanical alloying method and thus to further improve the durability (see the comparison between Examples 1 and 4).

In the production method according to the present embodiment, the alloying treatment described above is conducted. This makes it possible to have a distance between Si regular tetrahedrons in an amorphous region in the range as described above. In addition to this, it is also possible to have a structure composed of the parent phase and the silicide phase as described above. It is possible to obtain a negative electrode active material (silicon-containing alloy) capable of exerting desired cycle durability particularly when the time for the alloying treatment (preferably by the mechanical alloying method) is 10 hours or longer. Incidentally, the time for the alloying treatment is preferably 12 hours or longer, more preferably 20 hours or longer, still more preferably 24 hours or longer, particularly preferably 30 hours or longer, and especially preferably 36 hours or longer, and among them, preferably 42 hours or longer and most preferably 48 hours or longer. It is possible to decrease (to have in a suitable range) the size of periodic array region determined by image analysis using a TEM image of the silicon-containing alloy or the like by increasing the time required for the alloying treatment in this manner. In addition to this, the intensity ratio (B/A) of the diffraction peak can be increased. Incidentally, the upper limit value of the time for the alloying treatment is not particularly set, but it may be usually 72 hours or shorter.

In addition, in the case of conducting the alloying treatment by the mechanical alloying method, alloying can be attained by putting crushing balls and raw material powders of the alloy in a crushing pot and increasing the number of revolutions of the apparatus to apply high energy to the raw material powders by using a ball mill apparatus as used in Examples. In the alloying treatment, the raw material powders can be alloyed as high energy is applied thereto by increasing the number of revolutions of the apparatus. That is, the raw material powders have heat as high energy is applied thereto and are thus alloyed to form a silicide phase as well as to amorphize the parent phase. It is possible to increase (to have in a suitable range) the distance between Si regular tetrahedrons in an amorphous region by increasing the number of revolutions (applied energy) of the apparatus to be used in the alloying treatment (500 rpm or more and preferably 600 rpm or more in the case of the apparatus used in Examples). Incidentally, as the raw material powders of the alloy, metal powders of Si, Sn, and M element (Ti and the like) may be used according to the composition ratio of the silicon-containing alloy. Incidentally, in the present embodiment, the energy applied to the silicon-containing alloy changes depending on the number of revolutions of the apparatus to be used, the number of crushing balls, the amount of sample (raw material powders of the alloy) filled in addition to the time for the alloying treatment, and thus a change in size of the periodic array region is observed. For this reason, it is possible to adjust the distance between Si regular tetrahedrons in an amorphous region to be larger (to have in a suitable range) by adjusting the number of revolutions of the apparatus to be used, the number of crushing balls, the amount of sample (raw material powders of the alloy) filled.

The alloying treatment by the method described above is usually conducted in a dry atmosphere, but the particle size distribution after the alloying treatment has a wide width from a small size to a large size in some cases. For this reason, it is preferable to conduct a crushing treatment and/or classification treatment to adjust the particle size.

The predetermined alloy to be essentially contained in the negative electrode active material layer has been described above, but the negative electrode active material layer may contain other negative electrode active materials. Examples of the negative electrode active material other than the predetermined alloy may include carbon such as natural graphite, artificial graphite, carbon black, activated carbon, carbon fiber, coke, soft carbon, and hard carbon, a pure metal such as Si or Sn, or an alloy-based active material having a composition ratio which deviates from the predetermined composition ratio described above, or a metal oxide such as $TiO$, $Ti_2O_3$, or $TiO_2$ or $SiO_2$, $SiO$, or $SnO_2$, a composite oxide of lithium and a transition metal such as $Li_{4/3}Ti_{5/3}O_4$ or $Li_7MnN$, Li—Pb alloy, Li—Al alloy, or Li. However, from the viewpoint of sufficiently exerting the action and effect obtained by using the predetermined alloy as the negative electrode active material, the content of the predetermined alloy in 100% by mass of the total amount of the negative electrode active material is preferably from 50 to 100% by mass, more preferably from 80 to 100% by mass, still more preferably from 90 to 100% by mass, particularly preferably from 95 to 100% by mass, and most preferably 100% by mass.

Subsequently, the negative electrode active material layer 13 contains a binder.

(Binder)

The binder is added for the purpose of binding the active materials with each other or the active material with the current collector and thus maintaining the electrode structure. The kind of the binder to be used in the negative electrode active material layer is also not particularly limited, and those described above as the binder to be used in the positive electrode active material layer can be used in the same manner. Hence, the detailed description thereon will be omitted here.

However, in the negative electrode active material layer, it is preferable to contain a water-based binder. This is because a water-based binder has a high binding force. In addition, a water-based binder has an advantage that it is possible to greatly suppress the capital investment in the production line and to decease the environmental burden since water vapor is generated at the time of drying as well as it is easy to procure water as a raw material.

A water-based binder refers to a binder using water as a solvent or dispersive medium, specifically, a thermoplastic resin, a polymer having rubber elasticity, a water-soluble polymer, and the like, or a mixture thereof belong thereto. Here, the binder using water as a dispersive medium includes all those to be expressed as latex or emulsion, it refers to a polymer emulsified with water or suspended in water, and examples thereof may include a polymer latex obtained by emulsion polymerization in a system that self-emulsifies.

Specific examples of the water-based binder may include a styrene-based polymer (styrene-butadiene rubber, a styrene-vinyl acetate copolymer, a styrene-acrylic copolymer, or the like), acrylonitrile-butadiene rubber, methyl methacrylate-butadiene rubber, a (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphazene, polyacrylonitrile, polystyrene, an ethylene-propylene-diene copolymer, polyvinyl pyridine, chlorosulfonated polyethylene, a polyester resin, a phenol resin, an epoxy resin; polyvinyl alcohol (average degree of polymerization is preferably from 200 to 4000 and more preferably from 1000 to 3000, and the saponification degree is preferably 80% by mole or more and more preferably 90% by mole or more) and any modified product thereof (a product obtained by saponifying from 1 to 80% by mole of the vinyl acetate units in a copolymer having a molar ratio of ethylene/vinyl acetate=2/98 to 30/70, a product obtained by partially acetalizing from 1 to 50% by mole of polyvinyl alcohol, or the like), starch and any modified product thereof (oxidized starch, starch esterified with phosphoric acid, cationized starch, or the like), cellulose derivatives (carboxymethyl cellulose, methyl cellulose, hydroxypropyl cellulose, hydroxyethyl cellulose, any salt thereof, and the like), polyvinyl pyrrolidone, polyacrylic acid (salt), polyethylene glycol, a copolymer of (meth)acrylamide and/or (meth)acrylic acid salt [(meth)acrylamide polymer, a (meth)acrylamide-(meth)acrylate copolymer, a (meth)acrylic acid alkyl (having from 1 to 4 carbon atoms) ester-(meth)acrylic acid salt copolymer, or the like], a styrene-maleic acid salt copolymer, Mannich-modified polyacrylamide, a formalin condensation type resin (an urea-formalin resin, a melamine-formalin resin, or the like), a polyamide-polyamine or dialkylamine-epichlorohydrin copolymer, polyethyleneimine, casein, soybean protein, synthetic protein, and a water-soluble polymer such as a galactomannan derivative. These water-based binders may be used singly or two or more kinds thereof may be used concurrently.

From the viewpoint of binding property, it is preferable that the water-based binder contain at least one rubber-based binder selected from the group consisting of styrene-butadiene rubber, acrylonitrile-butadiene rubber, methyl methacrylate-butadiene rubber, and methyl methacrylate rubber. Furthermore, the water-based binder preferably contains styrene-butadiene rubber since the binding property is favorable.

In the case of using styrene-butadiene rubber as the water-based binder, it is preferable to concurrently use the water-soluble polymer described above from the viewpoint of improving the coatability. Examples of the suitable water-soluble polymer to be concurrently used with the styrene-butadiene rubber may include polyvinyl alcohol and any modified product thereof, starch and any modified product thereof, cellulose derivatives (carboxymethyl cellulose, methyl cellulose, hydroxyethyl cellulose, any salt thereof, and the like), polyvinyl pyrrolidone, polyacrylic acid (salt), or polyethylene glycol. Among them, it is preferable to combine styrene-butadiene rubber and carboxymethyl cellulose (salt) as the binder. The contained mass ratio of the styrene-butadiene rubber to the water-soluble polymer is not particularly limited, but styrene-butadiene rubber:water-soluble polymer is preferably 1:0.1 to 10 and more preferably 1:0.5 to 2.

Among the binders to be used in the negative electrode active material layer, the content of the water-based binder is preferably from 80 to 100% by mass, preferably from 90 to 100% by mass, and preferably 100% by mass.

The amount of the binder contained in the negative electrode active material layer is not particularly limited as long as it is an amount in which the active material can be bound, but it is preferably from 0.5 to 20% by mass and more preferably from 1 to 15% by mass with respect to the negative electrode active material layer.

(Requirements Common to Positive Electrode and Negative Electrode Active Material Layers 15 and 13)

The requirements common to the positive electrode and negative electrode active material layers 15 and 13 will be described below.

The positive electrode active material layer 15 and the negative electrode active material layer 13 contain an electric conductive auxiliary, an electrolyte salt (lithium salt), an ion conductive polymer, and the like if necessary. In particular, the negative electrode active material layer 13 essentially contains an electric conductive auxiliary as well.

(Electric Conductive Auxiliary)

The electric conductive auxiliary is an additive to be blended in order to improve the electric conductivity of the positive electrode active material layer or the negative electrode active material layer. Examples of the electric conductive auxiliary may include carbon materials such as carbon black such as acetylene black, graphite, and vapor-grown carbon fiber. An electronic network which can contribute to improvement of output characteristics of the battery is effectively formed in the interior of the active material layer when the active material layer contains an electric conductive auxiliary.

The content of the electric conductive auxiliary to be mixed in the active material layer is in a range of 1% by mass or more, more preferably 3% by mass or more, and still more preferably 5% by mass or more with respect to the total amount of the active material layer. In addition, the content of the electric conductive auxiliary to be mixed in the active material layer is in a range of preferably 15% by mass or less, more preferably 10% by mass or less, still more preferably 7% by mass or less with respect to the total amount of the active material layer. The electron conductivity of the active material itself is low, the electrode resistance can be decreased by the amount of the electric conductive auxiliary, and the following effects are exerted by regulating the blending ratio (content) of the electric conductive auxiliary in the active material layer to be in the above range. That is, it is possible to sufficiently ensure the electron conductivity without hindering the electrode reaction, to suppress a decrease in energy density due to a decrease in electrode density, and thus to attain the improvement in energy density due to the improvement in electrode density.

In addition, an electric conductive binder having the functions of both the electric conductive auxiliary and the binder may be used instead of these electric conductive auxiliary and binder or may be concurrently used with one or both of these electric conductive auxiliary and binder. As the electric conductive binder, commercially available TAB-2 (manufactured by Hohsen Corp.) can be used.

(Electrolyte Salt (Lithium Salt))

Examples of the electrolyte salt (lithium salt) may include $Li(C_2F_5SO_2)_2N$, $LiPF_6$, $LiBF_4$, $LiClO_4$, $LiAsF_6$, and $LiCF_3SO_3$.

(Ion Conductive Polymer)

Examples of the ion conductive polymer may include a polyethylene oxide-based (PEO) polymer and a polypropylene oxide-based (PPO) polymer.

The blending ratio of the components contained in the positive electrode active material layer and the negative electrode active material layer is not particularly limited. The blending ratio can be adjusted by appropriately referring to known knowledge on nonaqueous solvent secondary batteries.

The thickness of each active material layer (the active material layer on one side of the current collector) is also not particularly limited, and conventionally known knowledge on batteries can be appropriately referred to. As an example, the thickness of each active material layer is usually about from 1 to 500 μm and preferably from 2 to 100 μm in consideration of the intended use (output-oriented, energy-oriented, or the like) of the battery and ion conductivity.

<Current Collector>

The current collectors 11 and 12 are composed of an electric conductive material. The size of the current collector is determined according to the application of the battery. For example, a current collector having a large area is used when the current collector is used in a large battery requiring a high-energy density.

The thickness of the current collector is also not particularly limited. The thickness of the current collector is usually about from 1 to 100 μm.

The shape of the current collector is also not particularly limited. In the stacked type battery 10 illustrated in FIG. 1, a mesh shape (expanded grid or the like) or the like can be used in addition to the current collector foil.

Incidentally, it is desirable to use a current collecting foil in the case of directly forming a thin film alloy of the negative electrode active material on the negative electrode current collector 11 by a sputtering method or the like.

The material constituting the current collector is not particularly limited. For example, a metal or a resin in which an electric conductive filler is added to an electric conductive polymer material or an electric nonconductive polymer material can be employed.

Specifically, examples of the metal may include aluminum, nickel, iron, stainless steel, titanium, and copper. In addition to these, a clad material of nickel with aluminum, a clad material of copper with aluminum, a plated material of a combination of these metals, or the like can be preferably used. In addition, it may be a foil fabricated by covering aluminum on a metal surface. Among them, aluminum, stainless steel, copper, and nickel are preferable from the viewpoints of electron conductivity, action potential of battery, adhesive property of the negative electrode active material to the current collector by sputtering, and the like.

In addition, examples of the electric conductive polymer material may include polyaniline, polypyrrole, polythiophene, polyacetylene, polyparaphenylene, polyphenylenevinylene, polyacrylonitrile, and polyoxadiazole. Since such an electric conductive polymer material exhibits sufficient electric conductivity even without adding an electric conductive filler thereto and it is thus advantageous from the viewpoint of facilitating the production process or decreasing the weight of the current collector.

Examples of the electric nonconductive polymer material may include polyethylene (PE; high density polyethylene (HDPE), low density polyethylene (LDPE), and the like), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), or polystyrene (PS). Such an electric nonconductive polymer material can exhibit excellent electric potential resistance or solvent resistance.

An electric conductive filler may be added to the electric conductive polymer material or electric nonconductive polymer material described above if necessary. An electric conductive filler is necessarily essential in order to impart electric conductivity to the resin particularly in a case in which the resin to be the base material of the current collector is composed only of an electric nonconductive polymer.

The electric conductive filler can be used without being particularly limited as long as it is a substance exhibiting electric conductivity. Examples of a material exhibiting excellent electric conductivity, electric potential resistance, or lithium ion shielding property may include metal and electric conductive carbon. The metal is not particularly limited, but it is preferable to contain at least one kind of metal selected from the group consisting of Ni, Ti, Al, Cu, Pt, Fe, Cr, Sn, Zn, In, Sb, and K or an alloy or metal oxide containing these metals. In addition, the electric conductive carbon is not particularly limited. It is preferably one that contains at least one kind selected from the group consisting of acetylene black, vulcan, black pearl, carbon nanofiber, Ketjen black, carbon nanotube, carbon nanohorn, carbon nanoballoon, and fullerene.

The amount of the electric conductive filler added is not particularly limited as long as it is an amount in which sufficient electric conductivity can be imparted to the current collector, and it is generally about from 5 to 35% by mass.

<Electrolyte Layer>

As the electrolyte constituting the electrolyte layer 17, a liquid electrolyte or a polymer electrolyte can be used.

The liquid electrolyte has a form in which a lithium salt (electrolyte salt) is dissolved in an organic solvent. Examples of the organic solvent may include carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC).

In addition, as the lithium salt, it is possible to employ a compound that can be added to the active material layer of an electrode such as $Li(CF_3SO_2)_2N$, $Li(C_2F_5SO_2)_2N$, $LiPF_6$, $LiBF_4$, $LiAsF_6$, $LiTaF_6$, $LiClO_4$, or $LiCF_3SO_3$.

Meanwhile, the polymer electrolyte is classified into a gel electrolyte containing an electrolytic solution and an intrinsic polymer electrolyte which does not contain an electrolytic solution.

The gel electrolyte has a configuration in which the liquid electrolyte (electrolytic solution) is injected into a matrix polymer composed of an ion conductive polymer. It is excellent to use a gel polymer electrolyte as the electrolyte from the viewpoint that the fluidity of the electrolyte is eliminated and ionic conduction between the respective layers is easily shielded.

Examples of the ion conductive polymer to be used as the matrix polymer may include polyethylene oxide (PEO), polypropylene oxide (PPO), and a copolymer thereof. Such a polyalkylene oxide-based polymer can readily dissolve an electrolyte salt such as a lithium salt.

The proportion of the liquid electrolyte (electrolytic solution) in the gel electrolyte is not particularly limited, but it is preferably set to about several percent by mass to 98% by mass from the viewpoint of ionic conductivity and the like.

In the present embodiment, there is an effect particularly for a gel electrolyte containing a large amount of electrolytic solution, namely, having a proportion of the electrolytic solution of 70% by mass or more.

Incidentally, a separator may be used in the electrolyte layer in a case in which the electrolyte layer is composed of a liquid electrolyte, a gel electrolyte, or an intrinsic polymer electrolyte. Examples of the specific form of the separator (including a nonwoven fabric) may include a microporous membrane formed of a polyolefin such as polyethylene or polypropylene, a porous flat plate, or a nonwoven fabric.

The intrinsic polymer electrolyte has a configuration in which a supporting salt (lithium salt) is dissolved in the matrix polymer described above, and it does not contain an organic solvent as a plasticizer. Hence, liquid leakage from the battery is not concerned and the reliability of the battery can be improved in a case in which the electrolyte layer is composed of the intrinsic polymer electrolyte.

A matrix polymer of the gel electrolyte or the intrinsic polymer electrolyte can exert excellent mechanical strength by forming a crosslinked structure. In order to form a crosslinked structure, a polymerizable polymer (for example, PEO or PPO) for forming a polymer electrolyte may be subjected to a polymerization treatment such as heat polymerization, ultraviolet polymerization, radiation polymerization, or electron beam polymerization using a proper polymerization initiator.

<Current Collecting Plate and Lead>

A current collecting plate may be used for the purpose of taking out the electric current to the outside of the battery. The current collecting plate is electrically connected to the current collector and the lead and brought out to the outside of the laminate sheet of the battery outer packaging material.

The material constituting the current collecting plate is not particularly limited and a known highly electric conductive material which is conventionally used as a current collecting plate for lithium ion secondary battery can be used. As the material constituting the current collecting plate, for example, metal materials such as aluminum, copper, titanium, nickel, stainless steel (SUS), and any alloy thereof are preferable, and aluminum, copper, and the like are more preferable from the viewpoint of light weight, corrosion resistance, and high electric conductivity. Incidentally, the same material or different materials may be used in the positive electrode current collecting plate and the negative electrode current collecting plate.

A positive terminal lead and a negative terminal lead are used if necessary. As a material for the positive electrode terminal lead and the negative electrode terminal lead, a known terminal lead that is used in a lithium ion secondary battery can be used. Incidentally, it is preferable that the portion to be brought out from a battery outer packaging material 29 be covered with a heat-shrinkable tube or the like exhibiting heat resistance and insulation property so as not to affect the products (for example, automotive parts and especially electronic devices) by coming in contact with peripheral devices, wires, and the like and thus causing a short circuit.

<Battery Outer Packaging Material>

As the battery outer packaging material 29, it is possible to use a bag-shaped case which can cover the power generating element and uses a laminate film containing aluminum in addition to a known metal can case. As the laminate film, for example, a laminate film having a three-layer structure formed by laminating PP, aluminum, and nylon in this order, or the like can be used, but the laminate film is not limited to these. A laminate film is preferable from the viewpoint of having a high output and cooling performance and being able to be suitably utilized in a battery for large device for EV and HEV.

Incidentally, the lithium ion secondary battery can be produced by a conventionally known production method.

<Configuration of Appearance of Lithium Ion Secondary Battery>

FIG. 4 is a perspective view which illustrates the appearance of a stacked type flat lithium ion secondary battery.

Figure 3:
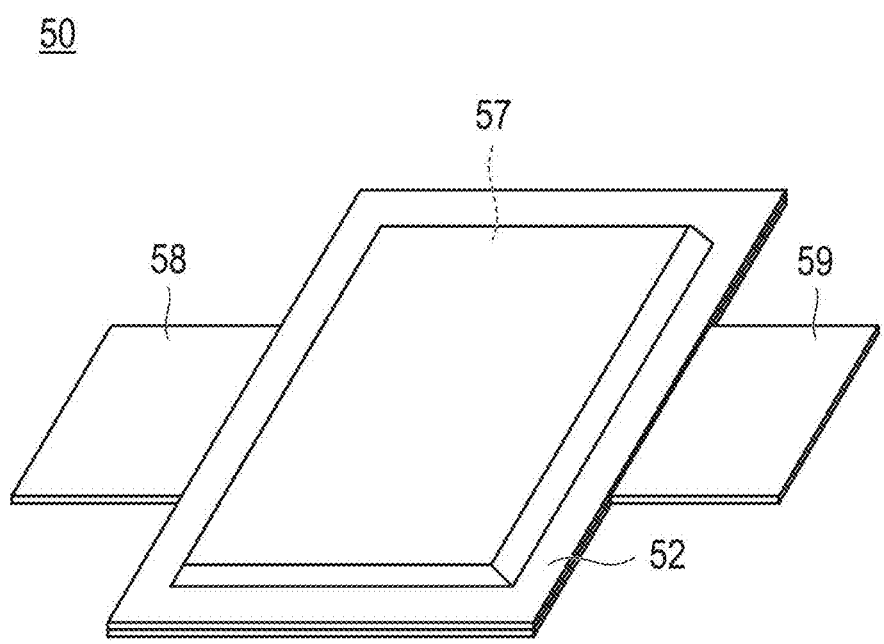
FIG. 3 is a perspective view which schematically illustrates the appearance of a stacked type flat lithium ion secondary battery of a representative embodiment of an electric device according to the present invention.

As illustrated in FIG. 3, a stacked type flat lithium ion secondary battery 50 has a rectangular flat shape, and a positive electrode current collecting plate 59 and a negative electrode current collecting plate 58 for taking out electric power are pulled out from both side portions thereof. A power generating element 57 is wrapped in a battery outer packaging material 52 of the lithium ion secondary battery 50, the periphery of the battery outer packaging material 52 is heat-sealed, and the power generating element 57 is hermetically sealed in a state in which the positive electrode current collecting plate 59 and the negative electrode current collecting plate 58 are pulled out to the outside. Here, the power generating element 57 corresponds to the power generating element 21 of the lithium ion secondary battery (stacked type battery) 10 illustrated in FIG. 1. The power generating element 57 is formed by stacking a plurality of single battery layers (single cells) 19 including the positive electrode (positive electrode active material layer) 13, the electrolyte layer 17, and the negative electrode (negative electrode active material layer) 15.

Incidentally, the lithium ion secondary battery is not limited to a stacked type one having a flat shape (laminate cell). The lithium ion secondary battery may be one having a cylindrical shape (coin cell) or one having a prismatic shape (square cell) as a wound type lithium ion battery, one obtained by deforming the one having a cylindrical shape to have a rectangular flat shape, and further a cylindrical cell, and it is not particularly limited. In one having a cylindrical or prismatic shape, a laminate film or a conventional cylindrical can (metal can) may be used as the outer packaging material thereof, and the outer packaging material is not particularly limited. Preferably, the power generating element is packaged in an aluminum laminate film. The weight saving can be achieved by this form.

In addition, bringing out of the positive electrode current collecting plate 59 and the negative electrode current collecting plate 58 illustrated in FIG. 3 is not also particularly limited. The positive electrode current collecting plate 59 and the negative electrode current collecting plate 58 may be pulled out from the same side or each of the positive electrode current collecting plate 59 and the negative electrode current collecting plate 58 may be divided into a plurality of pieces and taken out from each side, and the bringing out is not limited to that illustrated in FIG. 3. In addition, in a wound type lithium ion battery, terminals may be formed by utilizing, for example, a cylindrical can (metal can) instead of a current collecting plate.

As described above, the negative electrode and the lithium ion secondary battery which are formed by using the negative electrode active material for lithium ion secondary battery of the present embodiment can be suitably utilized as a large capacity power source for electric vehicles, hybrid electric vehicles, fuel cell vehicles, hybrid fuel cell vehicles, and the like. That is, they can be suitably utilized in a vehicle driving power source and an auxiliary power source which are required to have a high-volume energy density and a high-volume output density.

Incidentally, in the above embodiment, a lithium ion battery has been exemplified as an electric device, but the present invention is not limited thereto, and the negative electrode active material can also be applied to secondary batteries of other types and even primary batteries. In addition, it can be applied not only to batteries but also to capacitors.

(Sorting Method of Negative Electrode Active Material for Electric Device)

Next, in an embodiment (second embodiment) of the sorting method of a negative electrode active material for electric device of the present invention, the negative electrode active material is formed of a silicon-containing alloy, a lattice image of the silicon-containing alloy obtained by using a transmission electron microscope (TEM) is subjected to Fourier transform processing to obtain a diffraction pattern, and suitability of the negative electrode active material is judged based on whether a distance between Si regular tetrahedrons is 0.39 nm or more or not when the distance between Si regular tetrahedrons in an amorphous region is calculated from a Fourier image obtained by subjecting a diffraction ring portion present in a width of from 0.7 to 1.0 when the distance between Si regular tetrahedrons is 1.0 in the diffraction pattern to inverse Fourier transform. That is, the negative electrode active material is sorted to be suitable as a negative electrode active material for electric device when the distance between Si regular tetrahedrons is 0.39 nm or more, and it is sorted (distinguished) to be unsuitable when the distance between Si regular tetrahedrons is less than 0.39 nm. The method is excellent from the viewpoint of being able to judge (sort) the suitability as a negative electrode active material for electric device by regulating the distance between Si and Si required for great improvement of durability by the magnitude of the distance between Si regular tetrahedrons in an amorphous region obtained through the TEM measurement. With regard to the negative electrode active material for electric device, for example, in a case in which the electric device is a lithium ion battery, there has been hitherto no means to estimate what kind of battery characteristics can be exerted when a silicon-containing alloy to be used as a negative electrode active material is incorporated in a battery but only the physical properties and the like thereof have been measured. For this reason, it has been required to judge the characteristics of each silicon-containing alloy by fabricating a wide variety of silicon-containing alloys by changing the composition and production method (production conditions) of the silicon-containing alloy, incorporating these into the battery, and conducting the charge and discharge test (cycle durability test). That is, it does not require much cost and a long time if only a silicon-containing alloy is fabricated, but it is general that it takes from several tenfold to several hundredfold the cost and time required for fabrication of a silicon-containing alloy in order to incorporate the silicon-containing alloy into a battery and to conduct the charge and discharge test (cycle durability test; usually about from 50 to 500 cycles). For this reason, great cost cut down and time savings are attained when it can be estimated (distinguished) that the silicon-containing alloy is a negative electrode active material suitable for an electric device such as a lithium ion battery by using the sorting method of the present embodiment at the fabrication stage of the silicon-containing alloy.

The method in which a lattice image of the silicon-containing alloy obtained by using TEM is subjected to Fourier transform processing to obtain a diffraction pattern and it is measured whether a distance between Si regular tetrahedrons is 0.39 nm or more or not when the distance between Si regular tetrahedrons in an amorphous region is calculated from a Fourier image obtained by subjecting the diffraction ring portion present in a width of from 0.7 to 1.0 when the distance between Si regular tetrahedrons is 1.0 in the diffraction pattern to inverse Fourier transform is as already described in the first embodiment, and the description thereon will be thus omitted here.

In addition, the negative electrode active material of the present embodiment may be formed of a silicon-containing alloy, and it is not particularly limited.

As the silicon-containing alloy (an alloy containing Si) is not particularly limited as long as it has an improved energy density as compared to the carbon and graphite-based negative electrode material. For example, it is possible to utilize a binary alloy represented by $Si_xM_yA_a$ (where A is unavoidable impurities, M is at least one kind selected from the group consisting of a metal element and a carbon element, x, y, and a represent values of percent by mass, and, $0<x<100$, $0<y<100$, and $0\leq a<0.5$ and $x+y+a=100$). As the $Si_xM_yA_a$ alloy, it is possible to use an $Si_xTi_yA_a$ alloy, an $Si_xCu_yA_a$ alloy, an $Si_xSn_yA_a$ alloy, an $Si_xAl_yA_a$ alloy, an $Si_xV_yA_a$ alloy, an $Si_xC_yA_a$ alloy, an $Si_xGe_yA_a$ alloy, an $Si_xZn_yA_a$ alloy, an $Si_xNb_yA_a$ alloy, and the like. Furthermore, it is possible to use a ternary alloy represented by $Si_xM1_yM2_zA_a$ (where A is unavoidable impurities, M1 and M2 are different from each other and at least one kind selected from the group consisting of a metal element and a carbon element, x, y, z, and a represent values of percent by mass, and $0<x<100$, $0<y<100$, $0<z<100$, and $0\leq a<0.5$ and $x+y+z+a=100$). As the $Si_xM1_yM2zA_a$ alloy, it is possible to use the silicon-containing alloy having a composition represented by Chemical Formula (I) previously described in the first embodiment or the like. In particular, it is also possible to use the following ternary Si alloys exhibiting excellent characteristics that the alloy is amorphous, the structural change accompanying the intercalation and deintercalation of Li is small, the battery performance is excellent, and the like in addition to the improvement of energy density for every alloy. Examples thereof may include an alloy represented by the following Formula (1);

[Chemical Formula 5]

$$Si_xSn_yAl_zA_a \quad (1)$$

(where A is unavoidable impurities, x, y, z, and a represent values of percent by mass, and $12\leq x<100$, preferably $31\leq x<100$, and more preferably $31\leq x\leq 50$, $0<y\leq 45$ and preferably $15\leq y\leq 45$, $0<z\leq 43$ and preferably $18\leq z\leq 43$, and $0\leq a<0.5$ and $x+y+z+a=100$). In addition, examples thereof may include an alloy represented by the following Formula (2);

[Chemical Formula 6]

$$Si_xSn_yV_zA_a \quad (2)$$

(where A is unavoidable impurities, x, y, z, and a represent values of percent by mass, and $27\leq x<100$, preferably $27\leq x\leq 84$, and more preferably $27\leq x\leq 52$, $0<y\leq 73$, preferably $10\leq y\leq 73$, more preferably $10\leq y\leq 63$, and particularly preferably $10\leq y\leq 40$, $0<z\leq 73$, preferably $6\leq z\leq 73$, more preferably $6\leq z\leq 63$, and particularly preferably $20\leq z\leq 63$, and $0\leq a\leq 0.5$ and $x+y+z+a=100$). Furthermore, examples thereof may include an alloy represented by the following Formula (3);

[Chemical Formula 7]

$$Si_xSn_yC_zA_a \quad (3)$$

(where A is unavoidable impurities, x, y, z, and a represent values of percent by mass, and $29\leq x<100$, preferably $29 \leq x \leq 63$, more preferably $29 \leq x \leq 44$, and particularly preferably $29 \leq x \leq 40$, and $0 < y < 100$, preferably $14 \leq y \leq 48$, and more preferably $34 \leq y \leq 48$, $0 < z < 100$ and preferably $14 \leq z \leq 48$, and $0 \leq a < 0.5$ and $x+y+z+a=100$). Furthermore, examples thereof may include an alloy represented by the following Formula (4);

[Chemical Formula 8]

$$Si_xTi_yGe_zA_a \quad (4)$$

(where A is unavoidable impurities, x, y, z, and a represent values of percent by mass, and $17 \leq x \leq 90$, preferably $17 \leq x \leq 77$, more preferably $17 \leq x \leq 50$, and particularly preferably $17 \leq x \leq 46$, $10 < y < 83$, preferably $20 \leq y \leq 83$, more preferably $20 \leq y \leq 68$, and particularly preferably $20 \leq y \leq 51$, $0 < z < 73$, preferably $3 \leq z \leq 63$, and more preferably $3 \leq z \leq 32$, and $0 \leq a < 0.5$ and $x+y+z+a=100$). Furthermore, examples thereof may include an alloy represented by the following Formula (5);

[Chemical Formula 9]

$$Si_xTi_ySn_zA_a \quad (5)$$

(where A is unavoidable impurities, x, y, z, and a represent values of percent by mass, x, y, and z satisfy the following Mathematical Formula (1) or (2):

[Mathematical Formula 5]

$$35 \leq x \leq 78,\ 0 \leq y \leq 37,\ 7 \leq z \leq 30 \quad (1)$$

$$35 \leq x \leq 52,\ 0 \leq y \leq 35,\ 30 \leq z \leq 51 \quad (2)$$

preferably the following Mathematical Formula (3) or (4):

[Mathematical Formula 6]

$$35 \leq x \leq 78,\ 7 \leq y \leq 37,\ 7 \leq z \leq 30 \quad (3)$$

$$35 \leq x \leq 52,\ 7 \leq y \leq 35,\ 30 \leq z \leq 51 \quad (4)$$

more preferably the following Mathematical Formula (5) or (6):

[Mathematical Formula 7]

$$35 \leq x \leq 68,\ 18 \leq y \leq 37,\ 7 \leq z \leq 30 \quad (5)$$

$$39 \leq x \leq 52,\ 7 \leq y \leq 20,\ 30 \leq z \leq 51 \quad (6)$$

and still more preferably the following Mathematical Formula (7):

[Mathematical Formula 8]

$$46 \leq x \leq 58,\ 24 \leq y \leq 37,\ 7 \leq z \leq 21 \quad (7)$$

$0 \leq a < 0.5$, and $x+y+z+a=100$). Furthermore, examples thereof may include an alloy represented by the following Formula (6);

[Chemical Formula 10]

$$Si_xTi_yZn_zA_a \quad (6)$$

(where A is unavoidable impurities, x, y, z, and a represent values of percent by mass, x, y, and z satisfy the following Mathematical Formula (8):

[Mathematical Formula 9]

$$38 \leq x < 100,\ 0 < y < 62,\ 0 < z < 62 \quad (8)$$

preferably the following Mathematical Formula (9):

[Mathematical Formula 10]

$$38 \leq x < 100,\ 0 < y \leq 42,\ 0 < z \leq 39 \quad (9)$$

more preferably the following Mathematical Formula (10):

[Mathematical Formula 11]

$$38 \leq x \leq 72,\ 8 \leq y \leq 42,\ 12 \leq z \leq 39 \quad (10)$$

particularly preferably the following Mathematical Formula (11):

[Mathematical Formula 12]

$$38 \leq x \leq 61,\ 19 \leq y \leq 42,\ 12 \leq z \leq 35 \quad (11)$$

and, among them, preferably the following Mathematical Formula (12):

[Mathematical Formula 13]

$$47 \leq x \leq 53,\ 19 \leq y \leq 21,\ 26 \leq z \leq 35 \quad (12)$$

$0 \leq a < 0.5$, and $x+y+z+a=100$). Furthermore, examples thereof may include an alloy represented by the following Formula (7);

[Chemical Formula 11]

$$Si_xZn_yV_zA_a \quad (7)$$

(where A is unavoidable impurities, x, y, z, and a represent values of percent by mass, and $33 \leq x \leq 50$ and preferably $33 \leq x \leq 47$, $0 < y \leq 46$ and preferably $11 \leq y \leq 27$, $21 \leq z \leq 67$ and preferably $33 \leq z \leq 56$, and $0 \leq a < 0.5$ and $x+y+z+a=100$). Furthermore, examples thereof may include an alloy represented by the following Formula (8);

[Chemical Formula 12]

$$Si_xZn_ySn_zA_a \quad (8)$$

(where A is unavoidable impurities, x, y, z, and a represent values of percent by mass, and x is greater than 23 and less than 64, y is greater than 0 and less than 65, z is 4 or more and 58 or less, in addition, z is less than 34, furthermore, x is less than 44, z is 34 or more, in addition, y is greater than 27 and less than 61, furthermore, x is less than 34, in addition, y is greater than 38, z is less than 24, in addition, x is 24 or more and less than 38, furthermore, x is less than 38, y is greater than 27, z is less than 40, in addition, x is less than 29, z is 40 or more, and $0 \leq a < 0.5$ and $x+y+z+a=100$). Furthermore, examples thereof may include an alloy represented by the following Formula (9);

[Chemical Formula 13]

$$Si_xZn_yAl_zA_a \quad (9)$$

(where A is unavoidable impurities, x, y, z, and a represent values of percent by mass, x, y, and z satisfy $21 \leq x < 100$, $0 < y < 79$, and $0 < z < 79$, preferably $26 \leq x \leq 78$, $16 \leq y \leq 69$, and $0 < z \leq 51$, more preferably $26 \leq x \leq 66$, $16 \leq y \leq 69$, and $2 \leq z \leq 51$, and particularly preferably $26 \leq x \leq 47$, $18 \leq y \leq 44$, and $22 \leq z \leq 46$, $0 \leq a < 0.5$, and $x+y+z+a=100$). Furthermore, examples thereof may include an alloy represented by the following Formula (10);

[Chemical Formula 14]

$$Si_xZn_yC_zA_a \quad (10)$$

(where A is unavoidable impurities, x, y, z, and a represent values of percent by mass, x is greater than 25 and less than 54, y is greater than 13 and less than 69, and z is greater than 1 and less than 47 and preferably y is greater than 17, and z is less than 34, and $0 \leq a < 0.5$ and $x+y+z+a=100$). Furthermore, examples thereof may include an alloy represented by the following Formula (11);

[Chemical Formula 15]

$$Si_xAl_yC_zA_a \quad (11)$$

(where A is unavoidable impurities, x, y, z, and a represent values of percent by mass, x, y, and z satisfy $36 \leq x < 100$, $0 < y < 64$, and $0 < z < 64$, preferably $36 \leq x \leq 80$, $10 \leq y \leq 56$, and $3 \leq z \leq 37$, more preferably, $41 \leq x \leq 71$, $10 \leq y \leq 56$, and $3 \leq z \leq 29$, particularly preferably y is 15 or more, and, among them, preferably x is from 43 to 61 and y is from 20 to 54, $0 \leq a < 0.5$, and x+y+z+a=100). Furthermore, examples thereof may include an alloy represented by the following Formula (12);
[Chemical Formula 16]

$$Si_xAl_yNb_zA_a \quad (12)$$

where A is unavoidable impurities, x, y, z, and a represent values of percent by mass, x, y, and z satisfy 27<x<100, 0<y<73, and 0<z<58, preferably 47<x<95, 2<y<48, and 1<z<23, more preferably 61<x<84, 2<y<25, and 2<z<23, and particularly and preferably 47<x<56, 33<y<48, and 1<z<16, 0≤a<0.5, and x+y+z+a=100).

A silicon-containing alloy that can be judged to be suitable by the sorting method described above can be applied as a negative electrode active material as the surface thereof is covered with a carbon material. According to such a form, an electric conductive network is constructed between the active materials or between the active material and the electric conductive auxiliary and an electric conductive path in the electrode can be thus secured even in the case of using an active material which greatly expands and contracts. As a result, it is possible to suppress an increase in resistance even in the case of repeatedly charge and discharge the battery. As the amount of the carbon material covered in this case, an amount in which the electrical contact between the active materials or between the active material and the electric conductive auxiliary is favorable may be used according to the particle diameter of the silicon-containing alloy. The amount is preferably set to be about from 2 to 20% by mass with respect to the total mass of the active material covered. Incidentally, the term "covering" also includes a form in which the carbon material is present (attached) on a part of the surface of the active material in addition to a form in which the entire surface of the active material is covered with the carbon material.

Examples of the carbon material may include graphite (natural graphite, artificial graphite), carbon black, activated carbon, carbon fiber, coke, soft carbon, or hard carbon.

The average particle diameter of the silicon-containing alloy that can be judged to be suitable by the sorting method described above is not particularly limited, but it is preferably from 1 to 100 μm and more preferably from 1 to 20 μm from the viewpoint of high capacity, reactivity, and cycle durability of the battery. When the average particle diameter is in such a range, an increase in internal resistance of the secondary battery at the time of charge and discharge of the battery under a high-output condition is suppressed and a sufficient electric current can be taken out from the battery. Incidentally, in a case in which the active material is secondary particles, it can be said that the average particle diameter of the primary particles constituting the secondary particles is desirably in a range of from 10 nm to 1 μm, but it is not necessarily limited to the above range in the present embodiment. However, it is needless to say that the active material may not be formed into secondary particles by aggregation, agglomeration, or the like although it depends on the production method. As the particle diameter of the active material and the particle diameter of the primary particles, the median diameter obtained by using a laser diffraction method can be used. Incidentally, the shape of the active material that can be taken differs depending on the kind, production method, and the like of the active material, and examples thereof may include a spherical (powdery) shape, a plate shape, a needle shape, a columnar shape, and an angular shape, but it is not limited to these, and any shape can be used without problems. Preferably, it is desirable to appropriately select an optimum shape capable of improving the battery characteristics such as charge and discharge characteristics.

The invention will be described in more detail with reference to the following Examples. However, the technical scope of the present invention is not limited to only the following Examples.

Example 1

[Production of Silicon-Containing Alloy]

A silicon-containing alloy ($Si_{59}Sn_{22}Ti_{19}$) (unit: % by mass, the same applies hereinafter) was produced by a mechanical alloying method. Specifically, by using a planetary ball mill apparatus P-6 manufactured by Fritsch GmbH, zirconia crushing balls and raw material powders of the alloy were put in a zirconia crushing pot, alloyed at 600 rpm for 12.5 hours (alloying treatment), and then subjected to a crushing treatment at 400 rpm for 1 hour. Metal powders of Si, Sn, and Ti were used as the raw material powders of the alloy. Incidentally, the average particle diameter of the silicon-containing alloy (negative electrode active material) powder thus obtained was 6 μm. Here, the alloying treatment is to alloy the raw material powders of the alloy by applying high energy thereto through high revolution (600 rpm) of the apparatus (the raw material powders of the alloy have heat as high energy is applied thereto and are thus alloyed to form a silicide phase as well as to amorphize the parent phase). Meanwhile, the crushing treatment is a treatment for loosening secondary particles through low revolution (400 rpm) of the apparatus (alloying does not proceed at all during this treatment).

[Fabrication of Negative Electrode]

Mixed were 80 parts by mass of the silicon-containing alloy ($Si_{59}Sn_{22}Ti_{19}$) thus produced as the negative electrode active material, 5 parts by mass of acetylene black as an electric conductive auxiliary, and 15 parts by mass of polyamide-imide as a binder, the mixture thus obtained was dispersed in N-methylpyrrolidone (NMP) to obtain a negative electrode slurry. Subsequently, the negative electrode slurry thus obtained was uniformly coated on both sides of a negative electrode current collector formed of a copper foil such that the thickness of each of the negative electrode active material layer was 30 μm, and dried in a vacuum for 24 hours, thereby obtaining a negative electrode.

[Fabrication of Lithium Ion Secondary Battery (Coin Cell)]

The negative electrode thus fabricated and the counter electrode Li were allowed to face each other, and a separator (Polyolefin Cell Guard 2400 (manufactured by Celgard, LLC.), film thickness: 20 μm) was disposed therebetween. Subsequently, the stacked body of the negative electrode, the separator, and the counter electrode Li was disposed on the bottom side of a coin cell (CR 2032, material: stainless steel (SUS 316)). Furthermore, a gasket was fitted to maintain the insulation between the positive electrode and the negative electrode, the following electrolytic solution was injected by using a syringe, a spring and a spacer were stacked thereon, the upper side of the coin cell was superimposed thereon, and caulking was conducted to hermetically seal the coin cell, thereby obtaining a lithium ion secondary battery.

Incidentally, as the electrolytic solution, a solution prepared by dissolving lithium hexafluorophosphate ($LiPF_6$) as a lithium salt in an organic solvent in which ethylene carbonate (EC) and diethyl carbonate (DEC) were mixed at a proportion of EC:DEC=1:2 (volume ratio) at a concentration of 1 mol/L was used.

Example 2

A negative electrode active material, a negative electrode, and a lithium ion secondary battery (coin cell) were fabricated by the same method as in Example 1 described above except that the time for the alloying treatment when fabricating the silicon-containing alloy was changed to 25 hours. Incidentally, the average particle diameter of the silicon-containing alloy (negative electrode active material) powder thus obtained was 6 μm.

Example 3

A negative electrode active material, a negative electrode, and a lithium ion secondary battery (coin cell) were fabricated by the same method as in Example 1 described above except that the time for the alloying treatment when fabricating the silicon-containing alloy was changed to 50 hours. Incidentally, the average particle diameter of the silicon-containing alloy (negative electrode active material) powder thus obtained was 6 μm.

Example 4

A silicon-containing alloy ($Si_{60}Sn_{20}Ti_{20}$) (unit: % by mass, the same applies hereinafter) was produced by a mechanical alloying method (alloying treatment) after a step of quenching and solidifying (alloying treatment) a molten (fused) material obtained by melting (fusing) the raw materials by a cooling and rapid solidification method was carried out. Specifically, by using a cooling and rapid solidification apparatus manufactured by NISSIN GIKEN Corporation, a parent alloy of $Si_{60}Sn_{20}Ti_{20}$ was fused under reduced pressure purged with argon gas, sprayed on a copper roll having the number of revolutions of 3500 rpm at a spraying pressure of 0.05 MPa, and quenched and solidified (alloying treatment) to fabricate a flaky alloy. Thereafter, by using a planetary ball mill apparatus P-6 manufactured by Fritsch GmbH, zirconia crushing balls and the flaky alloy were put in a zirconia crushing pot, further alloyed (especially amorphization) (alloying treatment) at 600 rpm for 12 hours, and then subjected to a crushing treatment at 400 rpm for 1 hour. A silicon-containing alloy ($Si_{60}Sn_{20}Ti_{20}$) of a negative electrode active material was thus produced. After that, a negative electrode and a lithium ion secondary battery (coin cell) were fabricated by the same method as in Example 1 described above by using the negative electrode active material. Incidentally, the average particle diameter of the silicon-containing alloy (negative electrode active material) powder thus obtained was 6 μm. In addition, the parent alloy used in the cooling and rapid solidification method refers to an alloy ingot fabricated by melting raw materials of silicon (Si), tin (Sn), and titanium (Ti) (in amounts to be the composition ratio of alloy) by using an arc melting furnace (vacuum arc melting apparatus manufactured by NISSIN GIKEN Corporation) (the same applies hereinafter).

Example 5

A silicon-containing alloy ($Si_{60}Sn_{20}Ti_{20}$) was fabricated by carrying out a step of quenching and solidifying (alloying treatment) a molten (fused) material obtained by melting (fusing) raw materials by a cooling and rapid solidification method. Specifically, by using a cooling and rapid solidification apparatus manufactured by NISSIN GIKEN Corporation, a parent alloy of $Si_{60}Sn_{20}Ti_{20}$ was fused under reduced pressure purged with argon gas, sprayed on a copper roll having the number of revolutions of 3500 rpm at a spraying pressure of 0.05 MPa, and quenched and solidified (alloying treatment) to fabricate a flaky alloy. Thereafter, by using a planetary ball mill apparatus P-6 manufactured by Fritsch GmbH, zirconia crushing balls and the flaky alloy were put in a zirconia crushing pot and subjected to a crushing treatment at 400 rpm for 1 hour. After that, a negative electrode and a lithium ion secondary battery (coin cell) were fabricated by the same method as in Example 1 described above by using the negative electrode active material. Incidentally, the average particle diameter of the silicon-containing alloy (negative electrode active material) powder thus obtained was 6 μm.

Example 6

A negative electrode active material, a negative electrode, and a lithium ion secondary battery (coin cell) were fabricated by the same method as in Example 5 described above except that the composition of the silicon-containing alloy was changed to $Si_{60}Sn_{10}Ti_{30}$. Incidentally, the average particle diameter of the silicon-containing alloy (negative electrode active material) powder thus obtained was 6 μm.

Comparative Example 1

A negative electrode active material, a negative electrode, and a lithium ion secondary battery (coin cell) were fabricated by the same method as in Example 5 described above except that the composition of the silicon-containing alloy was changed to $Si_{60}Sn_{30}Ti_{10}$. Incidentally, the average particle diameter of the silicon-containing alloy (negative electrode active material) powder thus obtained was 6 μm.

Comparative Example 2

A negative electrode active material, a negative electrode, and a lithium ion secondary battery (coin cell) were fabricated by the same method as in Example 2 described above except that the composition of the silicon-containing alloy was changed to $Si_{70}Ti_{30}$ and the time for the alloying treatment when fabricating the silicon-containing alloy was changed to 24 hours. Incidentally, the average particle diameter of the silicon-containing alloy (negative electrode active material) powder thus obtained was 6 μm. Metal powders of Si and Ti were used as the raw material powders of the alloy.

[Measurement of Distance between Si Regular Tetrahedrons in an Amorphous Region (Distance between Si and Si) of Negative Electrode Active Material]

Figure 4C:
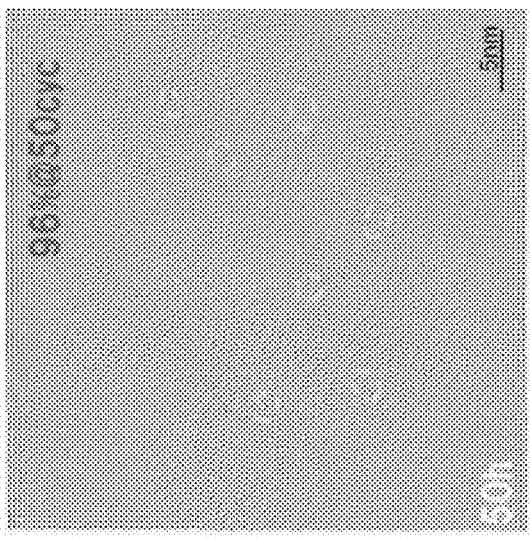
FIGS. 4(A) to 4(C) are views which illustrate Fourier images obtained in Examples 1 to 3.
Figure 4B:
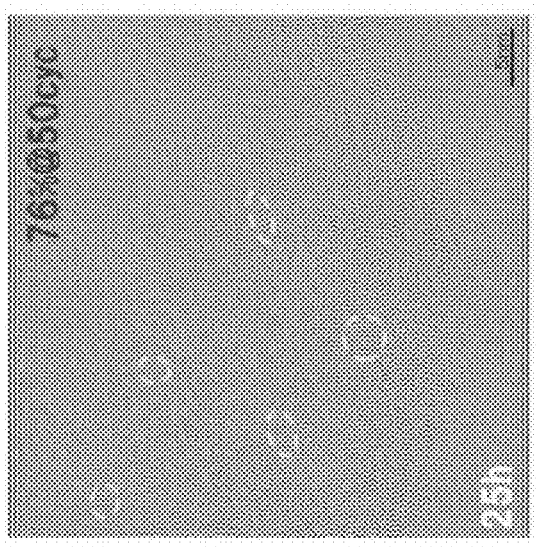
Figure 4A:
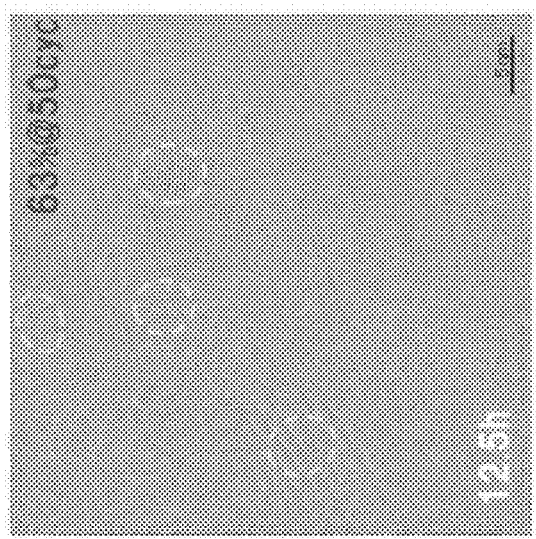

The results for the distance between Si regular tetrahedrons in an amorphous region measured (calculated) from the Fourier image obtained by image analysis using a TEM image of the negative electrode active material (silicon-containing alloy) fabricated in each of Examples 1 to 6 and Comparative Examples 1 and 2 by the method as previously described or the like are presented in the following Table 1 and FIG. 5. In addition, as previously described, the TEM image of the negative electrode active material (silicon-containing alloy) of Example 3, the diffraction pattern acquired by subjecting this TEM image to Fourier transform, and the Fourier image obtained by subjecting the diffraction ring portion of the Si (220) plane of this diffraction pattern to inverse Fourier transform are illustrated in FIGS. 2(A) to 2(C), respectively. In addition, the Fourier images obtained in Examples 1 to 3 are illustrated in FIGS. 4(A) to 4(C). Ellipses (ellipses enclosed by a one-dotted broken line) drawn so as to include the periodic array region (MRO) are illustrated in the Fourier images of FIGS. 4(A) to 4(C).

[Analysis of Textural Structure of Negative Electrode Active Material]

The textural structure of the negative electrode active material (silicon-containing alloy) fabricated in each of Examples 1 to 6 and Comparative Examples 1 and 2 was analyzed by the electron diffraction method, as a result, diffraction spots and halo patterns indicating the crystallinity of the silicide phase ($TiSi_2$) were observed in any of Examples 1 to 6, and it was confirmed that the negative electrode active materials had a textural structure in which a crystalline silicide phase (second phase) was dispersed in the amorphous Si phase of the parent phase (first phase). That is, it was confirmed that the negative electrode active material contained an alloy having a first phase containing silicon to form the parent phase as the main body and a second phase which contained a transition metal (Ti) and silicon and was adjacent to the first phase.

[Evaluation of Cycle Durability]

The cycle durability of each lithium ion secondary battery (coin cell) fabricated in each of Examples 1 to 6 and Comparative Examples 1 and 2 was evaluated under the following charge and discharge test conditions.

(Charge and Discharge Test Conditions)

1) Charge and Discharge Tester: HJ 0501 SMSA (manufactured by HOKUTO DENKO CORP.)

2) Charge and discharge conditions [Charge process] 0.3 C, 2 V→10 mV (constant current and constant voltage mode)

[Discharge process] 0.3 C, 10 mV→2 V (constant current mode)

3) Thermostatic chamber: PFU-3K (manufactured by ESPEC CORP.)

4) Evaluation temperature: 300 K (27° C.).

The evaluation cell (coin cell) was charged from 2 V to 10 mV at 0.1 mA in a constant current and constant voltage mode in a thermostatic chamber set at the above evaluation temperature by using a charge and discharge tester in the charge process (referred to as the process of intercalating Li into the evaluation electrode). Thereafter, the evaluation cell (coin cell) was discharged from 10 mV to 2 V at 0.3 C in a constant current mode in the discharge process (referred to as the process of deintercalating Li from the evaluation electrode). The charge and discharge cycle described above was taken as one cycle, and charge and discharge test was conducted from the initial cycle (1st cycle) to the 50 th cycle under the same charge and discharge conditions. Thereafter, the result for the discharge capacity in the first cycle and the result for the proportion (discharge capacity retention rate [%]) of the discharge capacity in the 50th cycle to the discharge capacity in the 1st cycle are presented in the following Table 1 and FIG. 5.

TABLE 1

|  | Negative electrode active material (composition of alloy) | Method of alloying treatment and treated time (h) | Distance between Si regular tetrahedrons (nm) | Initial capacity (mAH/g) | Discharge capacity retention rate after 50 cycles (%) |
|---|---|---|---|---|---|
| Example 1 | $Si_{59}Sn_{22}Ti_{19}$ | MA(P-BM) · 12.5 h | 0.42 | 1542 | 63 |
| Example 2 | $Si_{59}Sn_{22}Ti_{19}$ | MA(P-BM) · 25 h | 0.48 | 1519 | 76 |
| Example 3 | $Si_{59}Sn_{22}Ti_{19}$ | MA(P-BM) · 50 h | 0.53 | 1244 | 96 |
| Example 4 | $Si_{60}Sn_{20}Ti_{20}$ | Quenching roll → MA · 12 h | 0.42 | 1708 | 53 |
| Example 5 | $Si_{60}Sn_{20}Ti_{20}$ | Quenching roll | 0.41 | 1720 | 40 |
| Example 6 | $Si_{60}Sn_{10}Ti_{30}$ | Quenching roll | 0.49 | 1275 | 84 |
| Comparative Example 1 | $Si_{60}Sn_{30}Ti_{10}$ | Quenching roll | 0.38 | 2059 | 5 |
| Comparative Example 2 | $Si_{70}Ti_{30}$ | MA(P-BM) · 24 h | 0.38 | 2546 | 37 |

The term "MA(P-BM)" in the column for the method of alloying treatment and treated time indicates that the alloying treatment was conducted by the mechanical alloying method using the planetary ball mill apparatus P-6 manufactured by Fritsch GmbH. In addition, the term "quenching roll→MA" indicates that an alloying treatment was further conducted by the mechanical alloying method using the planetary ball mill apparatus P-6 manufactured by Fritsch GmbH after an alloying treatment step was carried out by spraying a fused material obtained by fusing the raw materials onto a copper roll and quenching and solidifying the fused material by the cooling and rapid solidification method. Furthermore, the term "quenching roll" indicates that the alloying treatment step was carried out by spraying a fused material obtained by fusing the raw materials onto a copper roll and quenching and solidifying the fused material by the cooling and rapid solidification method. In the case of the "quenching roll", the time for the alloying treatment (forming a flaky alloy by rapid solidification) is scarcely required (usually shorter than 1 minute) and thus omitted.

Figure 5:
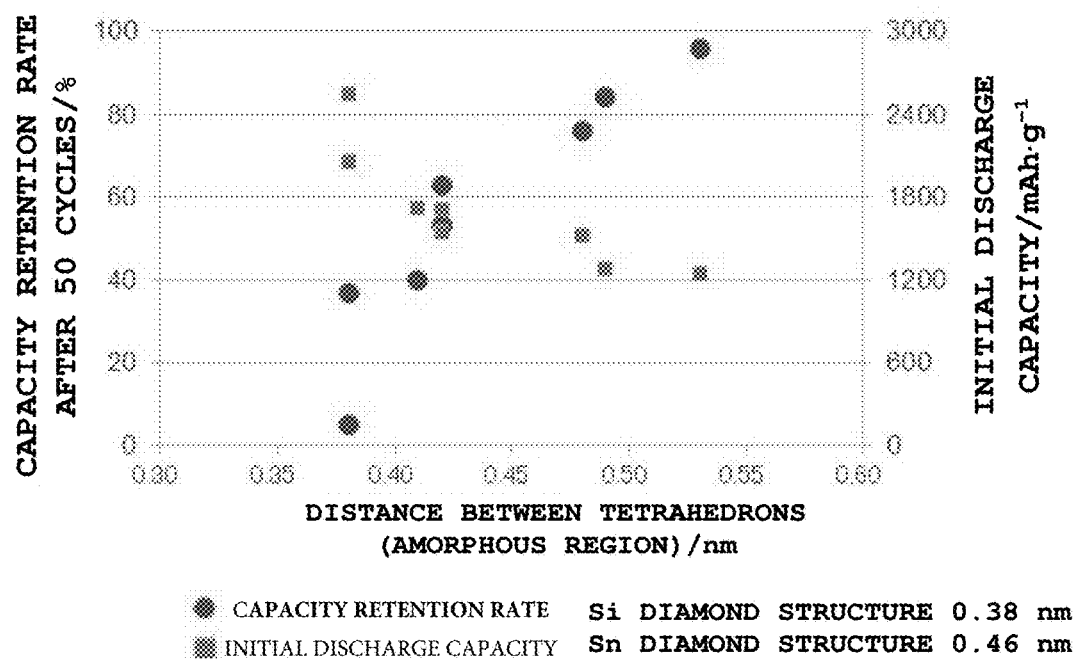

From the results presented in Table 1 and FIG. 5, in the lithium ion batteries using the negative electrode active materials of Examples 1 to 6, it can be seen that the discharge capacity retention rate after 50 cycles is maintained at a high value of 40% or more since the distance between Si regular tetrahedrons in an amorphous region increases to 0.39 nm or more. In addition, in Examples 1 to 4 and 6, it can be seen that the discharge capacity retention rate after 50 cycles is maintained at a high value of 53% or more since the distance between Si regular tetrahedrons in an amorphous region is as larger as 0.42 nm or more. Furthermore, in Examples 2, 3, and 6, it can be seen that the discharge capacity retention rate after 50 cycles is maintained at a high value of 76% or more since the distance between Si regular tetrahedrons in an amorphous region is as large as 0.48 nm or more. As described above, in the lithium ion batteries using the negative electrode active materials of the present Examples, it can be seen that the discharge capacity retention rate after 50 cycles is maintained at a high value and excellent cycle durability is exhibited.

REFERENCE SIGNS LIST 10 and 50 Lithium ion secondary battery (stacked type battery)
11 Negative electrode current collector
12 Positive electrode current collector
13 Negative electrode active material layer
15 Positive electrode active material layer
17 Electrolyte layer
19 Single battery layer
21 and 57 Power generating element
25 and 58 Negative electrode current collecting plate
27 and 59 Positive electrode current collecting plate
29 and 52 Battery outer packaging material (laminate film)

The invention claimed is:

1. A negative electrode active material for electric device comprising a silicon-containing alloy having a composition represented by the following Chemical Formula (I):

$$Si_xSn_yM_zA_a \quad (I)$$

wherein A is unavoidable impurities,
M is one or more transition metal elements,
x, y, z, and a represent values of percent by mass, and $0<x<100$, $0<y<100$, $0<z<100$, and $0\le a<0.5$ and $x+y+z+a=100$;
a lattice image of the silicon-containing alloy obtained by using a transmission electron microscope (TEM) is subjected to Fourier transform processing to obtain a diffraction pattern;
a distance between Si regular tetrahedrons is 0.48 nm or more when the distance between Si regular tetrahedrons in an amorphous region is calculated from a Fourier image obtained by subjecting a diffraction ring portion present in a width of from 0.7 to 1.0 when the distance between Si regular tetrahedrons is 1.0 in the diffraction pattern to inverse Fourier transform; and
the amorphous region is an amorphous phase comprising silicon with no transition metal element, and a silicide phase comprising both silicon and the one or more transition metal elements, dispersed in the amorphous phase the silicide phase having two or more phases having different composition ratios of the one or more transition metal elements to silicon.

2. The negative electrode active material for electric device according to claim 1, wherein M in Chemical Formula (I) above is titanium (Ti).

3. The negative electrode active material for electric device according to claim 1, wherein $7<z<100$ in Chemical Formula (I) above.

4. A negative electrode for electric device comprising the negative electrode active material for electric device according to claim 1.

5. An electric device comprising the negative electrode for electric device according to claim 4.

6. The negative electrode active material for electric device according to claim 1, wherein M is titanium and the x, y and z are $12\le x<100$, $0<y\le 45$ and $0<z\le 43$.

7. The negative electrode active material for electric device according to claim 1, wherein M is titanium and the x, y and z are $27\le x<100$, $0<y\le 73$ and $0<z\le 73$.

8. The negative electrode active material for electric device according to claim 1, wherein the silicide phase is a crystalline phase.

9. The negative electrode active material for electric device according to claim 1, wherein the amorphous phase is more amorphized than the silicide phase.

10. The negative electrode active material for electric device according to claim 1, wherein each dispersed silicide phase is 50 nm in diameter or less.

11. The negative electrode active material for electric device according to claim 1, wherein a volume percent of the silicide phase in the negative electrode active material is between 40% and 80%.

12. The negative electrode active material for electric device according to claim 1, wherein the distance between Si regular tetrahedrons is 0.49 nm to 0.55 nm when the distance between Si regular tetrahedrons in an amorphous region is calculated from a Fourier image obtained by subjecting a diffraction ring portion present in a width of from 0.7 to 1.0 when the distance between Si regular tetrahedrons is 1.0 in the diffraction pattern to inverse Fourier transform.

13. The negative electrode active material for electric device according to claim 1, wherein the distance between Si regular tetrahedrons is 0.53 nm to 0.55 nm when the distance between Si regular tetrahedrons in an amorphous region is calculated from a Fourier image obtained by subjecting a diffraction ring portion present in a width of from 0.7 to 1.0 when the distance between Si regular tetrahedrons is 1.0 in the diffraction pattern to inverse Fourier transform.

14. The negative electrode active material for electric device according to claim 1, wherein the silicon-containing alloy has an average particle diameter of 1 μm to 20 μm.

15. The negative electrode active material for electric device according to claim 1, further comprising an electric conductive auxiliary, wherein a mass percent of the electric conductive auxiliary in the negative electrode active material is between 5% and 15%.

16. The negative electrode active material for electric device according to claim 15, wherein the mass percent of the electric conductive auxiliary in the negative electrode active material is between 5% and 10%.

17. The negative electrode active material for electric device according to claim 15, wherein the mass percent of the electric conductive auxiliary in the negative electrode active material is between 5% and 7%.

* * * * *